US011219061B2

United States Patent
Chakraborty et al.

(10) Patent No.: US 11,219,061 B2
(45) Date of Patent: Jan. 4, 2022

(54) LISTEN-BEFORE-TALK (LBT) MODES FOR RANDOM ACCESS PROCEDURES

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Kapil Bhattad, Bangalore (IN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/508,610

(22) Filed: Jul. 11, 2019

(65) Prior Publication Data

US 2020/0037361 A1 Jan. 30, 2020

(51) Int. Cl.
*H04W 74/08* (2009.01)
*H04W 16/14* (2009.01)
*H04L 5/00* (2006.01)
*H04W 72/14* (2009.01)

(52) U.S. Cl.
CPC ....... *H04W 74/0808* (2013.01); *H04L 5/0053* (2013.01); *H04W 16/14* (2013.01); *H04W 72/14* (2013.01); *H04W 74/0833* (2013.01)

(58) Field of Classification Search
CPC . H04W 74/0808; H04W 16/14; H04W 72/14; H04W 74/0833; H04L 5/0053
See application file for complete search history.

(56) References Cited

U.S. PATENT DOCUMENTS

| 2014/0010173 | A1* | 1/2014 | Zakrzewski | H04W 74/0833 370/329 |
| 2014/0301351 | A1* | 10/2014 | Gao | H04W 74/08 370/329 |
| 2015/0057011 | A1* | 2/2015 | Di Girolamo | H04W 16/14 455/454 |
| 2016/0278088 | A1* | 9/2016 | Cheng | H04W 28/18 |
| 2016/0295609 | A1* | 10/2016 | Vajapeyam | H04L 5/14 |

(Continued)

FOREIGN PATENT DOCUMENTS

| EP | 3528527 A1 | 8/2019 |
| WO | 2017074638 A1 | 5/2017 |

(Continued)

OTHER PUBLICATIONS

International Search Report and Written Opinion—PCT/US2019/041707—ISA/EPO—dated Sep. 13, 2019.

(Continued)

*Primary Examiner* — Jael M Ulysse
(74) *Attorney, Agent, or Firm* — Liem T. Do

(57) ABSTRACT

Wireless communications systems and methods related to communicating random access messages are provided. A method includes communicating, by a first wireless communication device with a second wireless communication device, mode information for determining whether to perform a listen-before-talk (LBT) mode for a random access procedure. The method also includes communicating, by the first wireless communication device with the second wireless communication device, a random access message based on the mode information.

31 Claims, 17 Drawing Sheets

(56) References Cited

U.S. PATENT DOCUMENTS

| | | | |
|---|---|---|---|
| 2016/0323915 A1* | 11/2016 | Liu | H04W 74/0833 |
| 2016/0345206 A1* | 11/2016 | Yerramalli | H04L 5/005 |
| 2017/0048880 A1* | 2/2017 | Anderson | H04W 72/1226 |
| 2017/0055296 A1* | 2/2017 | Cheng | H04W 74/004 |
| 2017/0150523 A1* | 5/2017 | Patel | H04B 7/26 |
| 2017/0202022 A1* | 7/2017 | Chendamarai Kannan | H04W 72/14 |
| 2017/0223763 A1* | 8/2017 | Rahman | H04W 74/004 |
| 2017/0231005 A1* | 8/2017 | Babaei | H04L 5/001 |
| 2017/0231006 A1* | 8/2017 | Yin | H04W 72/0446 |
| 2017/0231011 A1* | 8/2017 | Park | H04W 74/006 |
| 2017/0245302 A1* | 8/2017 | Mukherjee | H04W 74/0808 |
| 2017/0265248 A1* | 9/2017 | Narasimha | H04W 52/0216 |
| 2017/0280481 A1* | 9/2017 | Stern-Berkowitz | H04W 74/0833 |
| 2017/0289869 A1* | 10/2017 | Nogami | H04W 36/0072 |
| 2017/0303303 A1* | 10/2017 | Yang | H04L 5/0053 |
| 2017/0318595 A1* | 11/2017 | Dinan | H04L 5/0053 |
| 2017/0325216 A1* | 11/2017 | Nogami | H04L 1/1896 |
| 2017/0339530 A1* | 11/2017 | Maaref | H04W 4/06 |
| 2017/0359808 A1* | 12/2017 | Dinan | H04L 5/0053 |
| 2018/0092073 A1* | 3/2018 | Nogami | H04W 72/042 |
| 2018/0110071 A1* | 4/2018 | Mukherjee | H04W 74/0808 |
| 2018/0123744 A1* | 5/2018 | Nogami | H04L 5/0053 |
| 2018/0176955 A1* | 6/2018 | Salem | H04W 52/08 |
| 2018/0176961 A1* | 6/2018 | Babaei | H04W 74/0833 |
| 2018/0199376 A1* | 7/2018 | Kim | H04L 1/0031 |
| 2018/0242317 A1* | 8/2018 | Marinier | H04W 56/003 |
| 2018/0255579 A1* | 9/2018 | Shimomura | H04W 74/08 |
| 2018/0270860 A1* | 9/2018 | Bhorkar | H04W 72/0406 |
| 2018/0279375 A1* | 9/2018 | Jeon | H04W 74/0833 |
| 2018/0279376 A1* | 9/2018 | Dinan | H04W 74/0833 |
| 2019/0075581 A1* | 3/2019 | Salem | H04W 74/006 |
| 2019/0387546 A1* | 12/2019 | Li | H04L 27/26025 |
| 2020/0008240 A1* | 1/2020 | Golitschek Edler Von Elbwart | H04W 76/11 |

FOREIGN PATENT DOCUMENTS

| | | | | |
|---|---|---|---|---|
| WO | WO-2017074638 A1 * | 5/2017 | | H04W 74/0808 |
| WO | WO-2017123769 A1 | 7/2017 | | |
| WO | 2018070087 A1 | 4/2018 | | |

OTHER PUBLICATIONS

Samsung: "Remaining issues of LBT for SRS", 3GPP Draft; R1-166689, 3rd Generation Partnership Project (3GPP), Mobile Competence Centre ; 650, Route Des Lucioles ; F-06921 Sophia-Antipolis Cedex ; France, vol. RAN WG1, No. Gothenburg, Sweden; Aug. 22, 2016-Aug. 26, 2016, Aug. 21, 2016 (Aug. 21 2016), XP051125512, 2 Pages, Retrieved from the Internet: URL:http://www.3gpp.org/ftp/Meetings_3GPP_SYNC/RAN1/Docs/ [retrieved on Aug. 21, 2016], section 1.

* cited by examiner

LISTEN-BEFORE-TALK (LBT) MODES FOR RANDOM ACCESS PROCEDURES

CROSS REFERENCE TO RELATED APPLICATIONS

The present application claims priority to and the benefit of India Patent Application No. 201841027750 filed Jul. 24, 2018 which is hereby incorporated by reference in its entirety as if fully set forth below and for all applicable purposes.

TECHNICAL FIELD

This application relates to wireless communication systems, and more particularly to improving random access performance in wireless networks by communicating a listen-before-talk (LBT) mode for transmission of messages.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR may operate over a wider bandwidth (BW) at higher frequencies than LTE. In addition, NR introduces the concept of BWPs, where a BS may dynamically configure a UE to communicate over a portion of a network system BW instead of over the entire network system BW. The use of BWPs can provide several benefits, such as reducing UE BW capability requirements, reducing power consumptions at UEs, reducing signaling overheads, and/or allowing for load balancing within a component carrier (CC), despite the wider network system BW. Further, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to one or more channels (e.g., frequency subbands) within the frequency spectrum. Depending on the LBT result, the transmitting node may access one or more channels. In some instances, the transmitting node may listen to different channels depending on whether the LBT is for an uplink (UL) channel access or for a downlink (DL) channel access.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, mode information for determining whether to perform a listen-before-talk (LBT) mode for a random access procedure. The method also includes communicating, by the first wireless communication device with the second wireless communication device, a random access message based on the mode information.

In another example, an apparatus includes a transceiver configured to communicate, by a first wireless communication device with a second wireless communication device, mode information for determining whether to perform an LBT mode for a random access procedure. The transceiver is further configured to communicate, by the first wireless communication device with the second wireless communication device, a random access message based on the mode information.

In another example, a computer-readable medium having program code recorded thereon, the program code including code for causing a first wireless communication device to communicate with a second wireless communication device mode information for determining whether to perform a listen-before-talk (LBT) mode for a random access procedure; and code for causing the first wireless communication device to communicate with the second wireless communication device a random access message based on the mode information.

In another example, a method of wireless communication includes communicating, by a first wireless communication device with a second wireless communication device, configuration information for selecting between a first frequency band and a second frequency band. The method also includes communicating, by the first wireless communication device with the second wireless communication device, a random access preamble in a first frequency band based on at least the configuration information. The method further includes communicating, by the first wireless communication device with the second wireless communication device, a connection request message in a second frequency band.

In another example, an apparatus includes a transceiver configured to communicate, by a first wireless communication device with a second wireless communication device, configuration information for selecting between a first frequency band and a second frequency band; communicate, by the first wireless communication device with the second wireless communication device, a random access preamble in a first frequency band based on at least the configuration information; and communicate, by the first wireless communication device with the second wireless communication device, a connection request message in a second frequency band.

In another example, a computer-readable medium having program code recorded thereon, the program code including code for causing a first wireless communication device to communicate with a second wireless communication device configuration information for selecting between a first frequency band and a second frequency band; code for causing the first wireless communication device to communicate with the second wireless communication device a random access preamble in a first frequency band based on at least the configuration information; and code for causing the first wireless communication device to communicate with the second wireless communication device a connection request message in a second frequency band.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
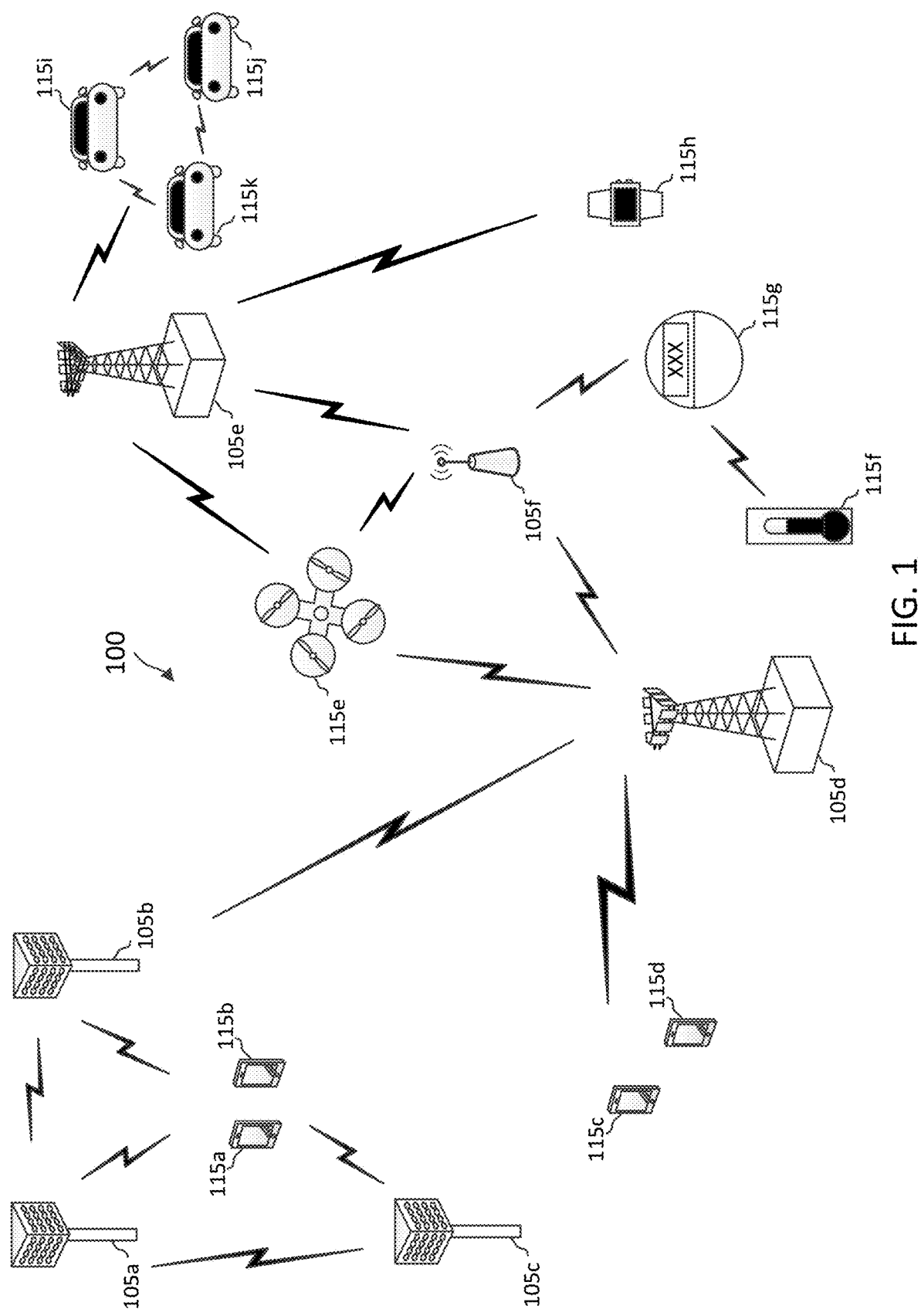
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement (ACK) in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for determining whether to perform a LBT mode for one or more random access message transmissions in a random access procedure. The LBT mode may be at least one of the category 2 LBT, category 4 LBT, or "no LBT" mode. The category 2 LBT refers to a LBT without a random backoff period, and the category 4 LBT refers to a LBT with a random backoff and a variable contention window. The UE and the BS may perform a random access procedure before entering a normal operation stage, where operational data may be exchanged. In an example, a wireless communication device (e.g., UE or BS) may perform a four-step random access procedure or a two-step random procedure. If the wireless communication device performs the random access procedure over a shared channel, the wireless communication device first ensures that the channel is clear before transmitting a random access message in the shared channel. The wireless communication device may perform a category 2 LBT, a category 4 LBT before each transmission, and communicates a random access message based on the mode information.

Additionally, the UE may select a frequency band of a plurality of frequency bands and communicate random access messages on the selected frequency band. A first frequency band may be a primary UL and a second frequency band may be a supplemental UL (SUL). Additionally, one of the first frequency band and the second frequency band may be in a licensed frequency band (e.g., SUL), and the other one of the first frequency band and the second frequency band may be in an unlicensed frequency band (e.g., primary UL). The present disclosure provides techniques for using two difference frequency bands for random access message transmissions in a random access procedure. For example, the UE may transmit a first random access message in an unlicensed frequency band and a subsequent random access message in a licensed frequency band, where the first and subsequent random access messages are part of the two-step or four-step random access procedure, which are discussed in more detail below.

FIG. 1 illustrates a wireless communication network 100 according to some embodiments of the present disclosure. The network 100 may be a 5G network. The network 100 includes a number of base stations (BSs) 105 and other network operating entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of 3 dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. A random access message may be transmitted in one or more mini-slots or one or more slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

A BS 105 may communicate with a UE 115 in units of slots, which may also be referred to as TTIs. Each slot may include a number of symbols in time and a number of frequency tones in frequency. Each slot may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

In an embodiment, the network 100 may be an NR network deployed over a licensed or unlicensed spectrum. The BSs 105 can transmit synchronization signals (e.g., including a primary synchronization signal (PSS) and a secondary synchronization signal (SSS)) in the network 100 to facilitate synchronization.

In an embodiment, a UE 115 attempting to access the network 100 may perform an initial cell search by detecting a PSS from a BS 105. The UE 115 performs synchronization to the BS 105 based on the synchronization signals. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

The BSs 105 can broadcast system information associated with the network 100 (e.g., including a master information block (MIB), remaining minimum system information (RMSI), and other system information (OSI)) to facilitate initial network access. Additionally, the system information may include, for example, cell access related information, a channel configuration, a physical random access (PRACH) configuration, and/or neighboring cell information. The PRACH configuration may indicate sequences, formats, and/or resources for random access preamble transmissions. In some examples, the broadcast system information (e.g., the RMSI and OSI) includes a random access message transmission configuration. The random access message transmission configuration may include starting times and ending times of various channels, such as control and data channels for UL and DL, and numerologies (e.g., tone spacing, subframe timing, and symbol timing) that define the various channels. In an embodiment, the starting times and ending times of the various channels are indicated in units of a fraction or subdivision of a subframe. In an example, the BS 105 assigns some portions of some subframes for random access preamble transmissions. In some instances, the BSs 105 may broadcast the PSS, the SSS, the MIB, the RMSI, and/or the OSI in the form of synchronization signal blocks (SSBs). Additionally, the BS 105 may broadcast the synchronization signals, the system information, and/or the random access message transmission configuration periodically.

The UE 115 downloads the system information. After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. In an example, the UE 115 downloads the random access message transmission configuration. In some embodiments, the BS 105 may send the random access message transmission configuration based on a request from the UE 115. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared frequency band or an unlicensed frequency band, for example, at about 3.5 gigahertz (GHz), sub-6 GHz or higher frequencies. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to reserve transmission opportunities (TXOPs) in the share medium for communications. TXOPs may be non-continuous in time and may refer to an amount of time a station can send frames when it has won contention for the wireless medium. Each TXOP may include a plurality of slots and one or more medium sensing periods. The BS 105 or the UE 115 may perform an LBT on multiple channels in the frequency band prior to transmitting in the frequency band and may transmit in one or more channels based on the LBT result. LBT is a channel access scheme that may be used in the unlicensed spectrum. One or more LBT modes may be selected from a plurality of LBT modes for a random access procedure, which includes communicating random access messages. An LBT mode may be, for example, a category 4 LBT, category 2 LBT, or "no LBT". A category 2 LBT refers to a LBT without a random backoff period. A category 4 LBT refers to a LBT with a random backoff and a variable contention window (CW).

Figure 2:
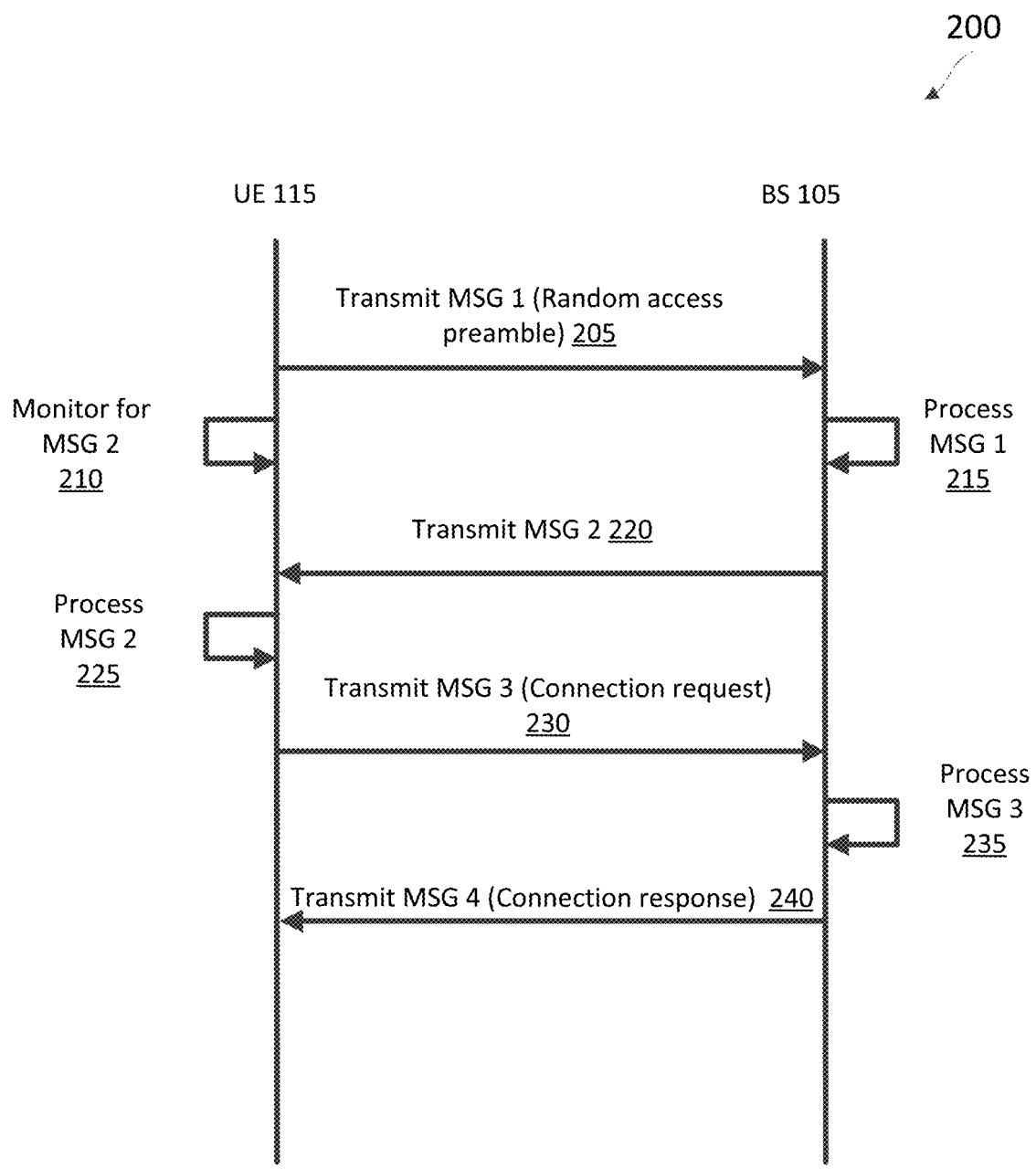
FIG. 2 is a protocol diagram of a method of performing a four-step random access procedure according to embodiments of the present disclosure.

The UE 115 and the BS 105 may perform a random access procedure before entering a normal operation stage, where operational data may be exchanged. The UE 115 and the BS 105 may perform a four-step random access procedure or a two-step random procedure. FIG. 2 is a protocol diagram of a method 200 of performing a four-step random access procedure according to embodiments of the present disclosure. Steps of the method 200 can be executed by computing devices (e.g., a processor, processing circuit, and/or other suitable component) of wireless communication devices, such as the BS 105 and the UE 115. As illustrated, the method 200 includes a number of enumerated steps, but embodiments of the method 200 may include additional steps before, after, and in between the enumerated steps. In some embodiments, one or more of the enumerated steps may be omitted or performed in a different order. The method 200 illustrates one BS 105 and one UE 115 for purposes of simplicity of discussion, though it will be recognized that embodiments of the present disclosure may scale to many more UEs 115 and/or BSs 105.

At step 205, the UE 115 transmits a first random access message (MSG 1) carrying a random access preamble according to the PRACH configuration. In some examples, the MSG 1 also includes a payload and a random access identifier (ID). The random access ID for a particular sent random access preamble can be derived based on the frequency-time resource used by the UE 115 to send the particular random access preamble. The random access IDs of the random access preambles are independent of each other. In the context of LTE, the random access IDs are referred to as random access-radio network temporary identifiers (RA-RNTIs).

At step 210, after sending the MSG 1, the UE 115 monitors for a second random access message (MSG 2) from the BS 105 within a random access response (RAR) window. In an example, the UE 115 sends a random access preamble in mini-slot I of Kth subframe, a corresponding RAR window begins at mini-slot starting J of (N+K)th subframe and spans a duration of L, where N may be greater than or equals 0 and J and L may be defined in one of the SIBs broadcasted by the BS 105. The UE 115 monitors for a RAR based on the random access ID to identify whether a received RAR is a response to a random access preamble transmitted by the UE 115.

At step 215, upon detecting the MSG 1, the BS 105 processes the MSG 1. For each detected random access preamble, the BS 105 may determine UL transmission timing of the UE 115 and assign a UL resource and a temporary ID to the UE 115 for sending a subsequent message. The BS 105 may assign the UL resources based on the random access message transmission configuration, for example, the tone spacing, the symbol timing, the starting time, and/or the ending time of the UL control and data channels. The BS 105 may identify a subsequent (or next) random access message (e.g., MSG 3) from the UE 115 by the temporary ID. In the context of LTE, the temporary IDs are referred to as temporary cell-radio network temporary identifiers (C-RNTIs).

At step 220, for each detected random access preamble, the BS 105 transmits a MSG 2 according to the random access message transmission configuration. The MSG 2, which is the RAR, is a response to the random access preamble received from the UE 115. A RAR may be carried in one or more mini-slots or one or more slots. Each RAR may include a control portion and a data portion. The MSG 2 carries an UL grant that may be used by the UE 115 to transmit content to the BS 105. The control portion is generated based on the random access ID of a corresponding random access preamble. The data portion carries a corresponding assigned resource, a corresponding assigned temporary ID, and corresponding timing advance information determined based on corresponding uplink transmission timing. In an example, the MSG 2 includes the assigned resources, the temporary ID, and the timing advance information.

At step 225, upon detecting the MSG 2, the UE 115 processes the MSG 2. In an example, the UE 115 retrieves the assigned resources, the temporary ID, and the timing advance information from the MSG 2.

At step 230, the UE 115 transmits a third random access message (MSG 3), which carries a connection request to the BS 105. In an example, the UE 115 responds to the RAR received from the BS 105 by transmitting the MSG 3. The MSG 3 may be sent according to the assigned resource, the temporary ID, the timing advancement information, and the random access message transmission configuration. The MSG 3 may be carried in one or more mini-slots or one or more slots.

At step 235, upon receiving the MSG 3, the BS 105 processes the MSG 3 and determines that the MSG 3 is sent in response to a RAR by the temporary ID. Accordingly, the BS 105 determines that the UE assigned to the temporary ID desires to connect to the network. At step 240, the BS 105 acknowledges receiving the MSG 3 by sending a MSG 4, which carries a connection response to the UE 115. The MSG 4 may be carried in one or more mini-slots or one or more slots.

Subsequently, the UE 115 may continue to initiate a registration process with the BS 105. The UE 115 may transmit an ACK for MSG 4 to the BS 105. In this example, the ACK corresponds to MSG 4 and indicates that the UE received the MSG 4.

Figure 3:
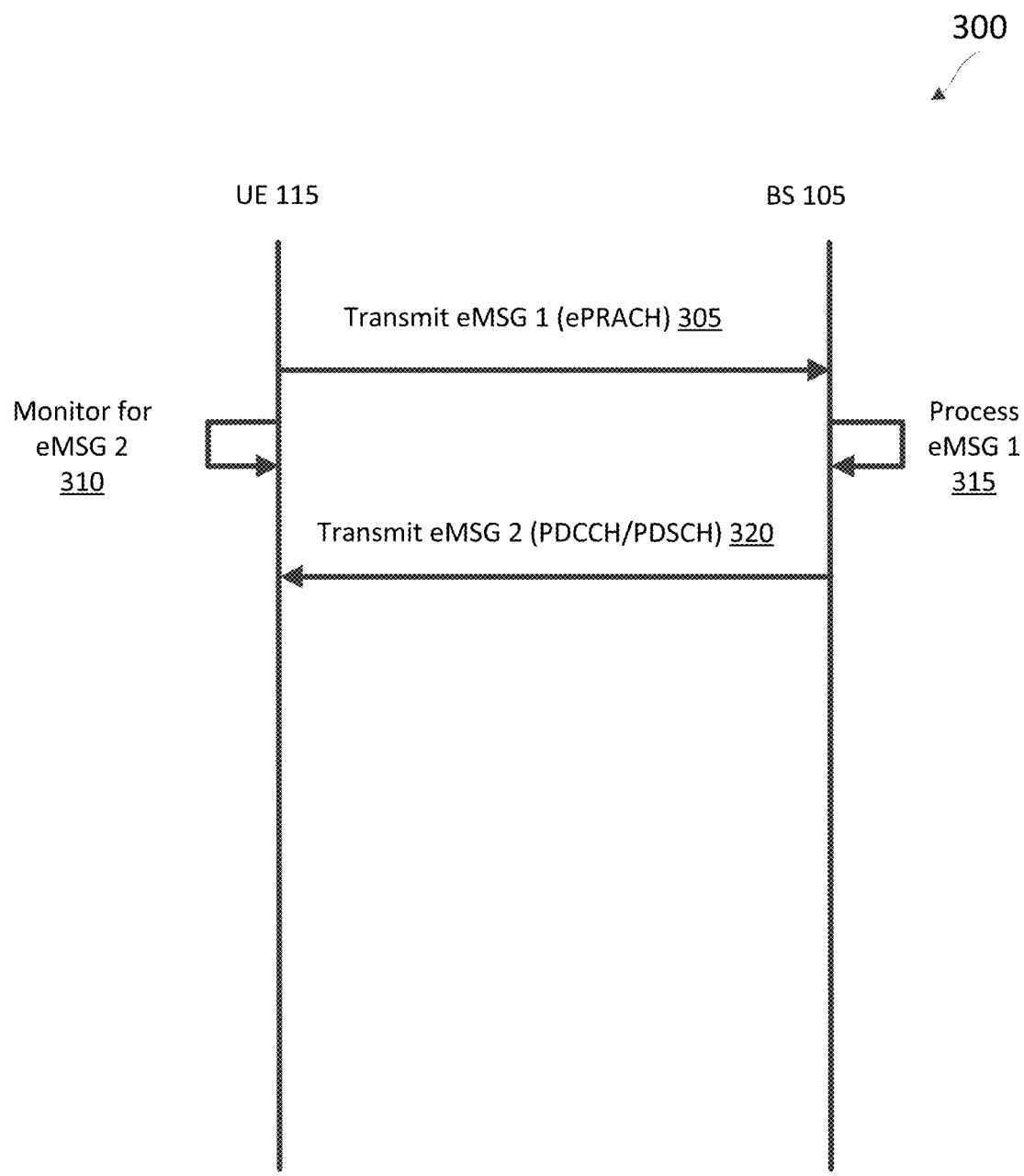
FIG. 3 is a protocol diagram of a method of performing a two-step random access procedure according to embodiments of the present disclosure.

FIG. 3 is a protocol diagram of a method 300 of performing a two-step random access procedure according to embodiments of the present disclosure. Steps of the method 300 can be executed by computing devices (e.g., a processor, processing circuit, and/or other suitable component) of wireless communication devices, such as the BS 105 and the UE 115. As illustrated, the method 300 includes a number of enumerated steps, but embodiments of the method 300 may include additional steps before, after, and in between the enumerated steps. In some embodiments, one or more of the enumerated steps may be omitted or performed in a different order. The method 300 illustrates one BS 105 and one UE 115 for purposes of simplicity of discussion, though it will be recognized that embodiments of the present disclosure may scale to many more UEs 115 and/or BSs 105.

At step 305, the UE 115 transmits a first enhanced message 1 (eMSG 1), which includes the MSG1 and the MSG3 of the method 200. The UE 115 may transmit the eMSG 1 in an enhanced physical random access channel (ePRACH). The ePRACH includes PUSCHs and a PRACH, as described in greater detail herein. The eMSG 1 may include a random access preamble, an RRC connection request, a tracking area update, a scheduling request, and a UE identifier (UE-ID). For example, the PRACH is transmitted in the PRACH of the ePRACH and the remaining eMSG1 is transmitted in the PUSCHs of the ePRACH. At step 310, after sending the eMSG 1, the UE 115 monitors for a second enhanced message (eMSG 2) within a RAR window from the BS 105.

At step 315, upon detecting the eMSG 1, the BS 105 processes the eMSG 1. At step 320, the BS 105 transmits the eMSG 2, which includes the MSG 2 and MSG 4 of the method 200. The BS 105 may transmit allocation information for the eMSG 2 in a PDCCH and the eMSG2 in a PDSCH. The eMSG2 may include a detected random access preamble ID, TA information, a C-RNTI, a backoff indicator, and a contention resolution. Subsequently, the UE 115 may continue to initiate a registration process with the BS 105. The UE 115 may transmit an ACK for the eMSG 2 to the BS 105.

As shown, a network operating entity may communicate two random access messages (the two-step random access procedure in the method 300) instead of four random access messages (the four-step random access procedure in the method 200).

When a UE 115 and a BS 105 perform the method 200 or 300 over a shared channel, the UE 115 and the BS 105 are required to ensure that the channel is clear before transmitting a random access message (e.g., MSG1, MSG2, MSG3, MSG4, eMSG1, and eMSG2) in the shared channel. The UE 115 and the BS 105 may perform a category 2 LBT or a category 4 LBT before each transmission. Alternatively, the LBT mode for a random access procedure may be "no LBT," which allows the network operating entity priority to transmit on the channel without sensing whether an entity is using the channel. It may be desirable for the category 2 LBT and the "no LBT" modes to be considered for transmission within the TXOP and for the category 4 LBT to be considered for transmission outside the TXOP.

It should be understood that reference to the reception/transmission of MSG 1 and MSG 3 (see FIG. 2) may refer to the reception/transmission of eMSG 1 (see FIG. 3), respectively, and reference to the reception/transmission of MSG 2 and MSG 4 (see FIG. 2) may refer to the reception/transmission of eMSG 2 (see FIG. 3), respectively. It should also be understood that reference to the reception/transmission of the ACK for MSG 4 (see FIG. 2) may refer to the reception/transmission of the ACK for eMSG 2 (see FIG. 3), respectively.

Figure 4:
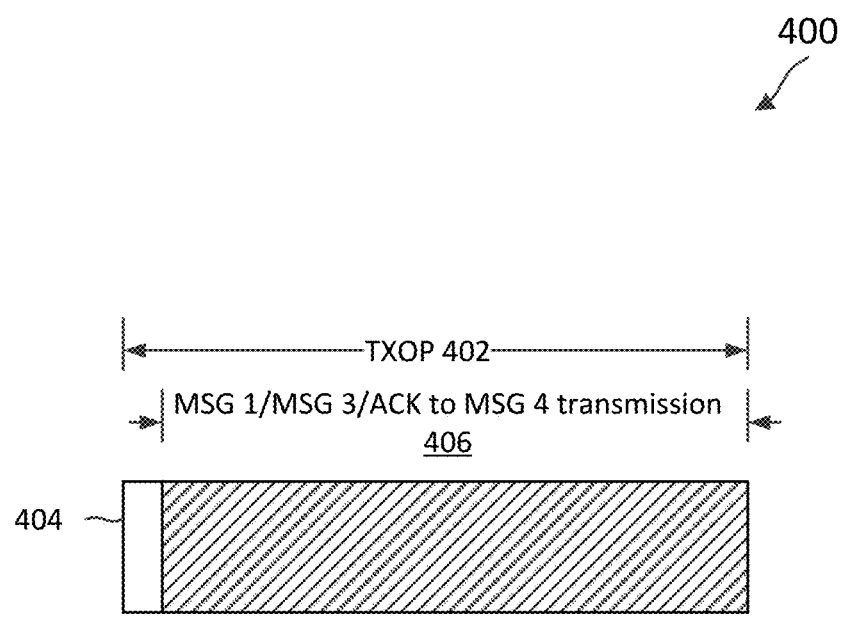
FIG. 4 illustrates completion of a random access procedure within a single transaction opportunity (TXOP) according to embodiments of the present disclosure.

FIG. 4 illustrates completion of a random access procedure within a single TXOP according to embodiments of the present disclosure. The scheme 400 may be employed by the network 100. In particular, a UE 115 may employ the scheme 400.

The scheme 400 may be implemented if the UE 115 grabs the medium and is able to transmit all of the random access messages in accordance with the random access procedure within a single TXOP 402. TXOP 402 includes a medium sensing period 404 and a transmission period 406. In this example, the UE 115 is able to hold onto the medium until the entire random access procedure has been completed. In an example, if the UE 115 performs the four-step random access procedure, the UE transmits the MSG 1 and MSG 3 and the ACK for MSG 4 and the BS 105 transmits the MSG 2 and MSG 4 (see method 200), all within the same TXOP 402. In another example, if the UE 115 performs the two-step random access procedure, the UE 115 transmits the eMSG 1 and the ACK for eMSG 2 and the BS 105 transmits the eMSG 2 (see method 300), all within the same TXOP 402. When the UE 115 determines that the random access procedure can be completed within a single TXOP, the UE 115 may perform a category 2 LBT.

In some examples, the UE 115 may not be able to transmit all of the random access messages in accordance with the random access procedure within the same TXOP. For example, if the UE 115 obtains access to the medium toward the end of the TXOP, the UE 115 may have sufficient time to transmit only one random access message (e.g., MSG 1). In another example, the BS 105 may take a significant amount of time to transmit the MSG 2, another operator may grab control of the medium, or a signal may jam the medium, preventing the random access procedure from being completed within a single TXOP. In these examples, the scheme 400 may not be practical for the random access procedure.

A network operating entity may perform different LBT modes for a random access procedure. An LBT mode may be, for example, the category 4 LBT, category 2 LBT, "no LBT," among others. In some examples, a first wireless communication device communicates with a second wireless communication device, mode information for determining whether to perform a LBT mode for a random access procedure. The first wireless communication device may further communicate with the second wireless communication device, a random access message based on the mode information. The present disclosure also discusses LBT on UL and/or DL transmission during the random access procedure.

In some examples, the mode information is communicated via a group-common PDCCH. In an example, the group-common PDCCH is used to indicate the start and duration of the TXOP (and potentially the slot format as well). In some examples, a wireless communication device (e.g., the BS 105 or the UE 115) communicates the group-common PDCCH for determining whether to perform the category 4 LBT, category 2 LBT, or "no LBT" mode.

In an example, the BS 105 communicates the mode information by transmitting the group-common PDCCH to the UE 115. The BS 105 indicates the search space for the group-common PDCCH detection in the system information (e.g., PBCH or RMSI). In an example, the BS 105 indicates that a particular PDCCH is used for a group of UEs. The BS 105 transmits the group-common PDCCH for determining whether to perform a LBT mode (e.g., category 2 BLT, category 4 LBT, or "no LBT") for a random access procedure (e.g., two-step random access procedure or four-step random access procedure).

The UE 115 determines the mode information by receiving the group-common PDCCH and determines, based on the group-common PDCCH, whether to perform a LBT mode for a random access procedure. The UE 115 may be configured with search space for the group-common PDCCH in NR-unlicensed. If UE 115 desires to detect the group-common PDCCH at a random access stage (before the UE is connected), it is desirable for the UE 115 to be configured with the search space for the group-common PDCCH.

In an example, the UE 115 determines, based on the group-common PDCCH, whether the MSG 1, MSG 3, and ACK for MSG 4 (see method 200) can be transmitted within a single TXOP. If so, the UE 115 performs the category 2 LBT for a random access procedure. In this example, the UE 115 communicates, based on the group-common PDCCH, one or more of the eMSG 1 and/or an ACK for eMSG 2 to the BS 105. The determination made by the UE 115 may be inaccurate because it may be based in part on assumptions of future transmissions from the BS 105 (e.g. MSG 2 and MSG 4 transmissions) that are conditioned on the BS 105 being able to grab the medium. If the UE 115 is unable to complete the full random access procedure within the TXOP, the UE 115 may attempt to complete the remaining steps in a future TXOP using the same mode information as determined from the group-common PDCCH.

If not (the transmission of the MSG 1, MSG 3, and ACK for MSG 4 cannot be transmitted within the same TXOP), the UE 115 performs the category 4 LBT for a random access procedure. In this example, the UE 115 communicates, based on the group-common PDCCH, one or more of the MSG 1, MSG 3, and/or ACK for MSG 4 to the BS 105.

The UE 115 may perform these transmissions even if they are outside the TXOP because the BS 105 has indicated that the group-common PDCCH is reserved for this kind of transmission. Accordingly, the BS 105 may be actively looking for potential UEs transmitting in this way.

The BS 105 transmits the MSG 2 and/or MSG 4 (see method 200) if the UE 115 performs the four-step random access procedure. In contrast, the BS 105 transmits the eMSG 2 (see method 300) if the UE 115 performs the two-step random access procedure.

Although the mode information is discussed as being communicated via a group-common PDCCH above, this is not intended to be limiting and other mechanisms for communicating the mode information may be used. For example, the BS 105 may communicate the mode information via the CTS/RTS, preamble, wake-up-signal etc.

When the UE 115 transmits a random access message outside of a TXOP, the UE 115 may perform a category 4 LBT prior to the transmission. In an example, the UE 115 may use high channel access priority class with a smaller maximum CW. The UE 115 may also update the CW for the MSG 1, MSG 3, and ACK for MSG 4 transmission. In other words, the UE 115 may use a different CW for transmission of different random access messages depending on the access priority class.

In some examples, the MSG1 and the MSG2 of method 200 are not transmitted within the same TXOP. In an example, in a first TXOP, the UE 115 transmits MSG 1 and thereafter waits for the MSG 2 from the BS 105. In a second TXOP subsequent to the first TXOP, the BS 105 grabs the medium and sends the MSG 2 to the UE 115. The BS 105 may communicate to the UE 115 mode information for determining the LBT mode for transmission of the MSG 3.

Figure 5:
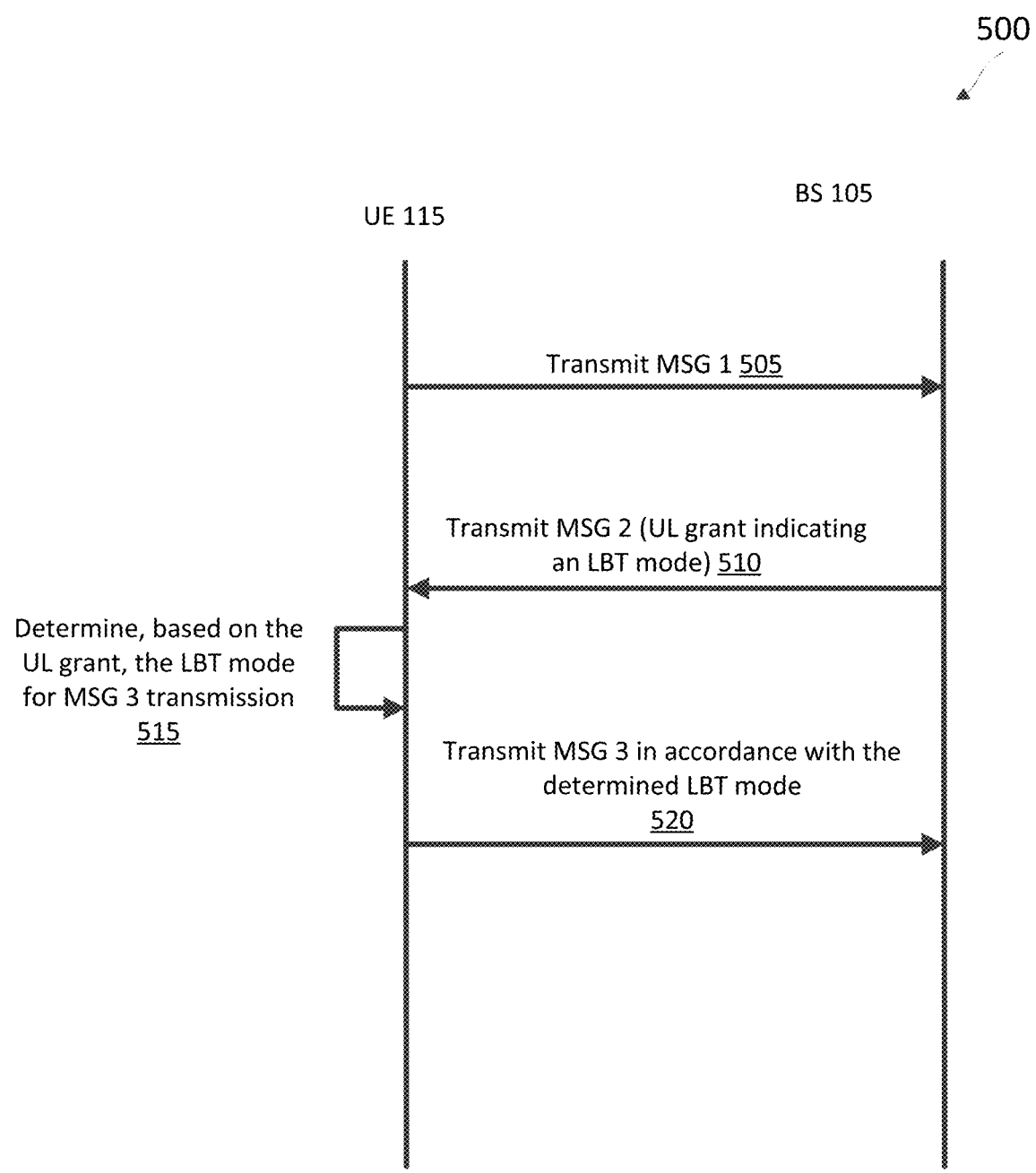
FIG. 5 is a protocol diagram of a method of communicating an uplink (UL) grant for determining the listen-before-talk (LBT) mode for transmission of a random access message according to embodiments of the present disclosure.

FIG. 5 is a protocol diagram of a method 500 of communicating an UL grant for determining the LBT mode for transmission of the MSG 3 according to embodiments of the present disclosure. Steps of the method 500 can be executed by computing devices (e.g., a processor, processing circuit, and/or other suitable component) of wireless communication devices, such as the BS 105 and the UE 115. As illustrated, the method 500 includes a number of enumerated steps, but embodiments of the method 500 may include additional steps before, after, and in between the enumerated steps. In some embodiments, one or more of the enumerated steps may be omitted or performed in a different order. The method 500 illustrates one BS 105 and one UE 115 for purposes of simplicity of discussion, though it will be recognized that embodiments of the present disclosure may scale to many more UEs 115 and/or BSs 105.

In some examples, a wireless communication device communicates mode information via a UL grant for determining whether to perform the category 4 LBT, the category 2 LBT, or "no LBT" mode for transmission of the MSG 3. At step 505, the UE 115 transmits the MSG 1. At step 510, the BS 105 transmits the MSG 2, which carries a UL grant for a MSG 3 in the data portion of the MSG 2. The UL grant can include an indication of an LBT mode. In an example, the LBT may be category 4 LBT, the category 2 LBT, or "no LBT" mode. Within the data portion of the MSG 2, this may be common to all UEs or included separately for each UE (as part of UL grant information of that UE). In this example, the BS 105 provides the UL grant to the UE 115, and the UL grant included in the RAR indicates the LBT mode for the UE 115 to perform for transmitting the MSG 3. Accordingly, in some instances, LBT category for MSG 3 initial transmission is provided to the UE in the RAR. The MSG 1 and MSG 2 may be transmitted in the same or different TXOPs.

At step 515, the UE 115 determines, based on the UL grant, the LBT mode for the MSG 3 transmission. At step 520, the UE 115 transmits the MSG 3 in accordance with the LBT mode determined in step 515. For example, if the UL grant in the RAR indicates the "no LBT" mode, the UE 115 may transmit the MSG 3 on the channel without medium sensing. In another example, if the UL grant in the RAR indicates the category 2 LBT mode, the UE 115 performs a category 2 LBT before transmitting the MSG 3. In another example, if the UL grant in the RAR indicates the category 4 LBT mode, the UE 115 performs a category 4 LBT before transmitting the MSG 3.

Additionally, for UEs performing the category 4 LBT in the method 500, the UL grant may indicate the channel access priority class for the MSG 3 transmission. Alternatively, the MSG 3 always uses a high channel access priority class with a smaller maximum CW.

Figure 6:
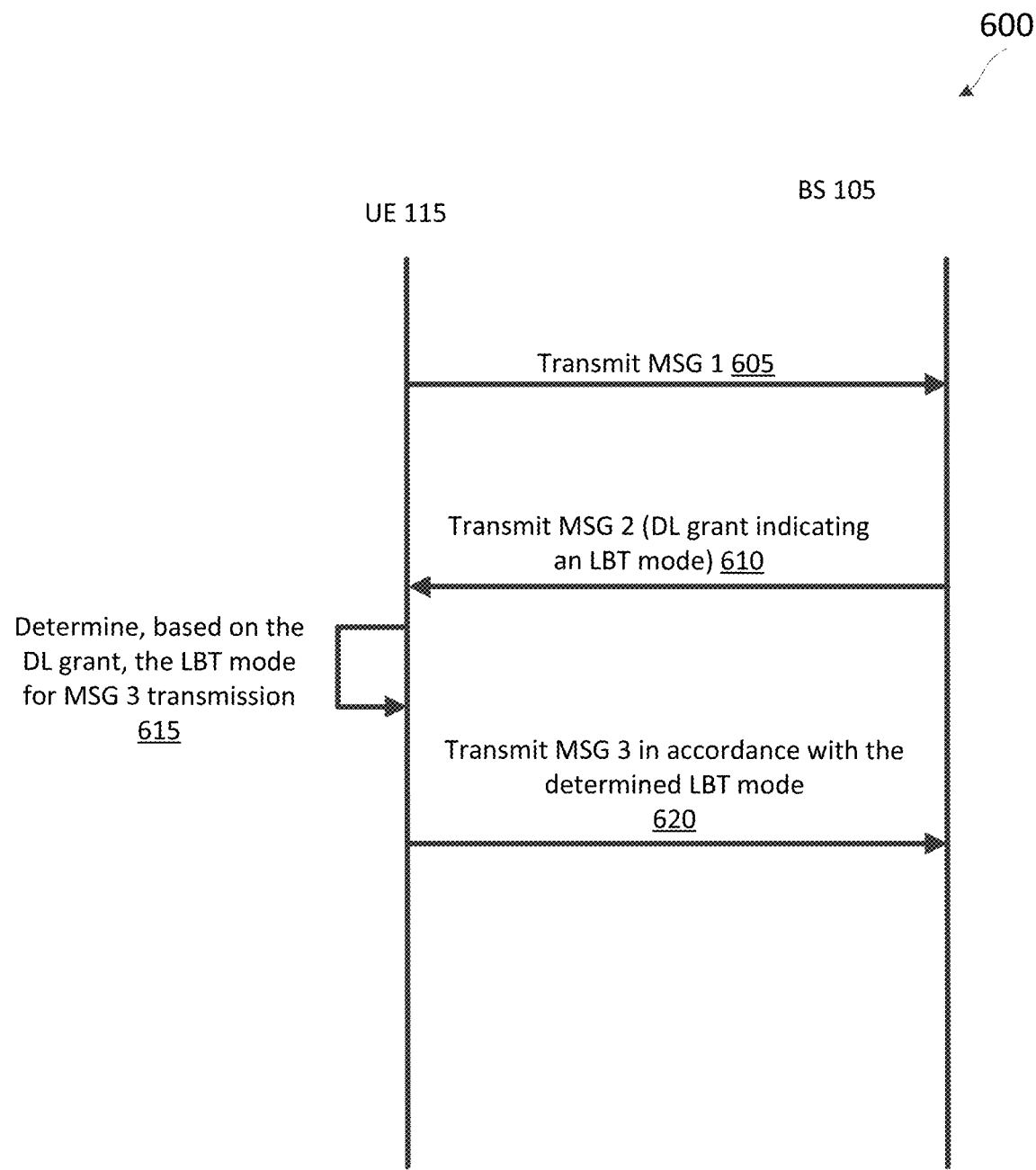
FIG. 6 is a protocol diagram of a method of communicating a downlink (DL) grant for determining the LBT mode for transmission of a random access message according to embodiments of the present disclosure.

FIG. 6 is a protocol diagram of a method 600 of communicating a DL grant for determining the LBT mode for transmission of the MSG 3 according to embodiments of the present disclosure. Steps of the method 600 can be executed by computing devices (e.g., a processor, processing circuit, and/or other suitable component) of wireless communication devices, such as the BS 105 and the UE 115. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS 105 and one UE 115 for purposes of simplicity of discussion, though it will be recognized that embodiments of the present disclosure may scale to many more UEs 115 and/or BSs 105.

In some examples, a wireless communication device communicates the mode information via a DL grant for determining whether to perform the category 4 LBT, category 2 LBT, or "no LBT" mode for transmission of the MSG 3. At step 605, the UE 115 transmits the MSG 1. At step 610, the BS 105 transmits the MSG 2. To transmit the MSG2, the BS 105 transmits a DL grant indicating scheduling information and/or a transmission configurations for the MSG 2 and subsequently transmits the MSG 2 according to the DL grant. In addition, the BS 105 includes the LBT mode in the DL grant for the MSG 2. The MSG 1, MSG 2, and/or MSG 3 may be transmitted in the same or different TXOPs.

At step 615, the UE 115 determines, based on the DL grant, the LBT mode for the MSG 3 transmission. In an example, the DL grant that is used to schedule the MSG 2 indicates the LBT mode for the UE 115 to perform for the MSG 3 transmission. Each RAR in the MSG 2 may correspond to a different preamble, and accordingly the LBT fields may be limited in terms of how many RARs can be accommodated within the DL grant. It may be desirable to design LBT fields for each RAR in the DL grant up to M RARs, where M is smaller than the number of UEs assigned in the DL grant. If more than M RARs are included in the MSG 2, the BS 105 may signal individual LBT modes for the first (M−1) RARs while signaling the same LBT for the rest of the RARs. In an example, the BS 105 receives a first set of RACH preambles from a first set of UEs and a second set of RACH preambles from a second set of UEs. In this example, BS 105 may communicate a first LBT mode for the first set of RACH preambles and communicate a second LBT mode for the second set of RACH preambles.

Additionally, for UEs performing the category 4 LBT when the DL grant indicates the LBT mode, the DL grant may indicate the channel access priority class for the MSG 3 transmission. Alternatively, the MSG 3 always uses a high channel access priority class with a smaller maximum CW.

In another example, the DL grant that is used to schedule the MSG 2 indicates the end of the TXOP. The end of the TXOP may be relative to the MSG 2 transmission. In an example, the BS 105 indicates to the UE 115 that the medium is available to the UE 115 until a particular time period elapses (e.g., available for another 5 ms). Accordingly, if the MSG 3 can be transmitted before the end of the TXOP (e.g., before the time period elapses), the UE 115 performs the category 2 LBT for the MSG 3 transmission. In contrast, if the MSG 3 cannot be transmitted before the end of the TXOP, the UE 115 performs the category 4 LBT for the MSG 3 transmission.

At step 620, the UE 115 transmits the MSG 3 in accordance with the LBT mode determined in step 615. For example, if the DL grant indicates the "no LBT" mode, the UE 115 may transmit the MSG 3 on the channel without medium sensing. In another example, if the DL grant indicates the category 2 LBT mode, the UE 115 performs a category 2 LBT before transmitting the MSG 3. In another example, if the DL grant indicates the category 4 LBT mode, the UE 115 performs a category 4 LBT before transmitting the MSG 3.

Referring to FIGS. 5 and 6, the BS 105 may exercise a controlled approach from the network side and impose some access control over the medium. For example, the BS 105 may receive multiple MSG is from multiple UEs and desire to stagger the load across the network by prioritizing the UEs. In an example, the BS 105 may schedule multiple UEs for the MSG 2 transmissions and schedule those UEs across a few TXOPs for their MSG 3 transmissions, assigning different LBT modes to different UEs for transmission of the MSG 3. The BS 105 may transmit first mode information (via a UL grant in the RAR or a DL grant used to schedule the MSG 2) to a first set of UEs to perform the "no LBT" mode, transmit second mode information to a second set of UEs to perform the category 2 LBT (these UEs may reserve transmission of the MSG 3 in the same TXOP as determined by the BS 105), and transmit third mode information to a third set of UEs to perform the category 4 LBT (these UEs may reserve transmission of the MSG 3 in a subsequent TXOP as determined by the BS 105). The third set of UEs transmits the MSG 3 outside the TXOP in which the MSG 2 is transmitted. Accordingly, the BS 105 may schedule or prioritize the UEs and their MSG 3 transmissions based on the LBT modes indicated by the BS and performed by the UEs.

Figure 7:
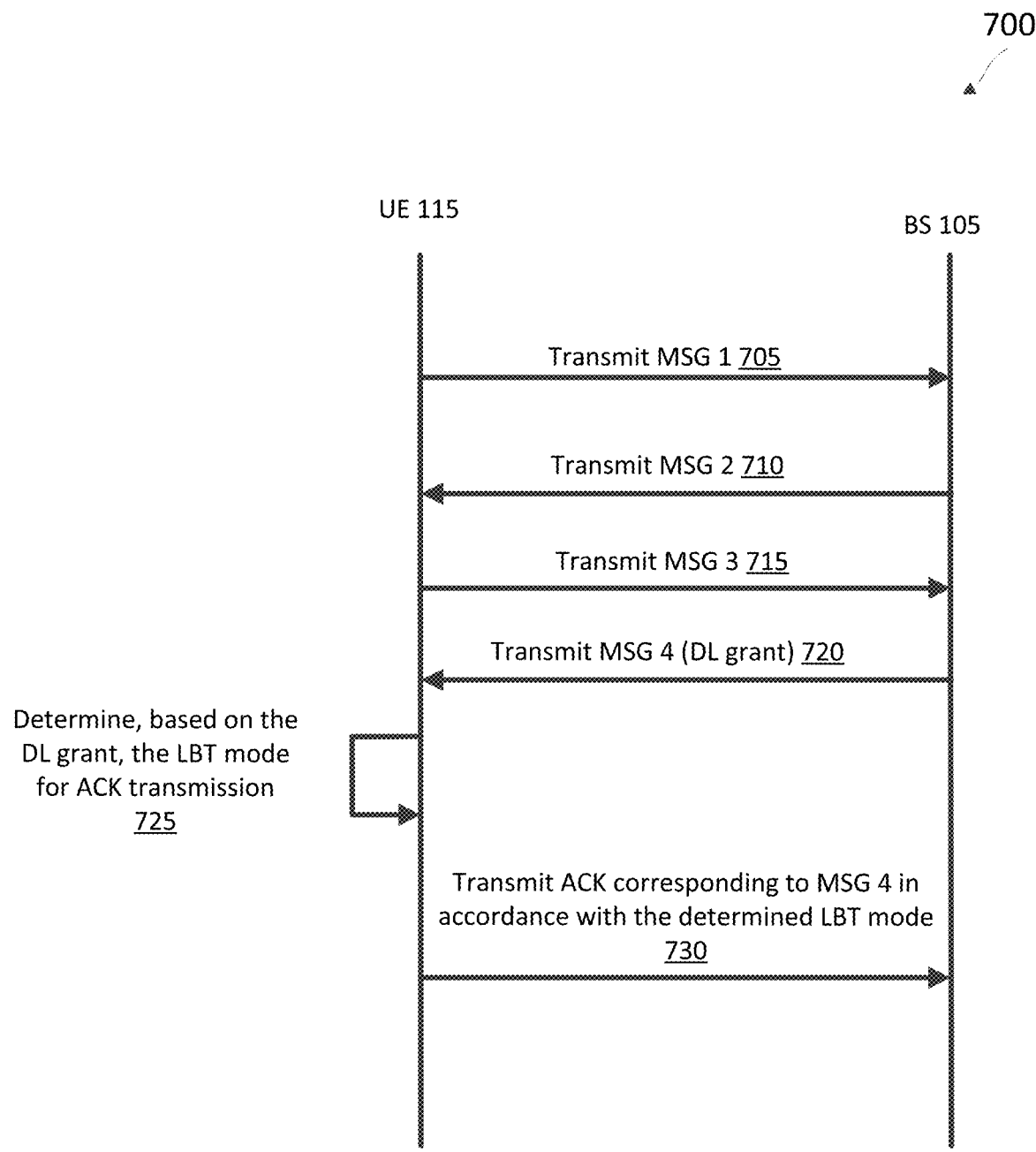
FIG. 7 is a protocol diagram of a method of communicating mode information for determining an LBT mode in association with transmission of an acknowledge (ACK) for a random access message according to embodiments of the present disclosure.

FIG. 7 is a protocol diagram of a method 700 of communicating mode information for determining an LBT mode in association with transmission of an ACK for the MSG 4 according to embodiments of the present disclosure. Steps of the method 700 can be executed by computing devices (e.g., a processor, processing circuit, and/or other suitable component) of wireless communication devices, such as the BS 105 and the UE 115. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates one BS 105 and one UE 115 for purposes of simplicity of discussion, though it will be recognized that embodiments of the present disclosure may scale to many more UEs 115 and/or BSs 105.

In some examples, a wireless communication device communicates mode information via a DL grant for determining whether to perform the category 4 LBT, category 2 LBT, or "no LBT" mode for transmission of an ACK for the MSG 4. At step 705, the UE 115 transmits the MSG 1. At step 710, the BS 105 transmits the MSG 2. At step 715, the UE 115 transmits the MSG 3. At step 720, the BS 105 transmits the MSG 4. The DL used to schedule the MSG 4 includes a LBT mode for the UE to transmit an ACK for the MSG 4. The MSG 1, MSG 2, MSG 3, and/or MSG 4 may be transmitted in the same or different TXOPs.

At step 725, the UE 115 determines, based on the DL grant used to schedule the MSG 4, the LBT mode for the ACK transmission. In an example, the DL grant indicates the LBT mode for the UE 115 to perform for transmitting the ACK in response to MSG 4 (at step 720). In another example, the DL grant indicates the end of the TXOP. The end of the TXOP may be relative to the MSG 4 transmission. In this example, the UE 115 determines to perform a particular LBT mode before transmitting the ACK in accordance with the end of the TXOP. In an example, the BS 105 indicates to the UE 115 that the medium is available to the UE 115 until a particular time period elapses (e.g., available for another 5 ms). Accordingly, if the ACK can be transmitted before the end of the TXOP (e.g., before the time period elapses), the UE 115 determines that the category 2 LBT should be performed for the ACK transmission. In contrast, if the ACK cannot be transmitted before the end of the TXOP, the UE 115 determines that the category 4 LBT should be performed for the ACK transmission.

At step 730, the UE 115 transmits the ACK in response to the MSG 4 in accordance with the LBT mode determined in step 725. For example, if the DL grant that is used to schedule the MSG 4 indicates the "no LBT" mode, the UE 115 may transmit the ACK on the channel without medium sensing. In another example, if the DL grant indicates the category 2 LBT mode, the UE 115 performs a category 2 LBT before transmitting the ACK. In another example, if the DL grant indicates the category 4 LBT mode, the UE 115 performs a category 4 LBT before transmitting the ACK.

Figure 8:
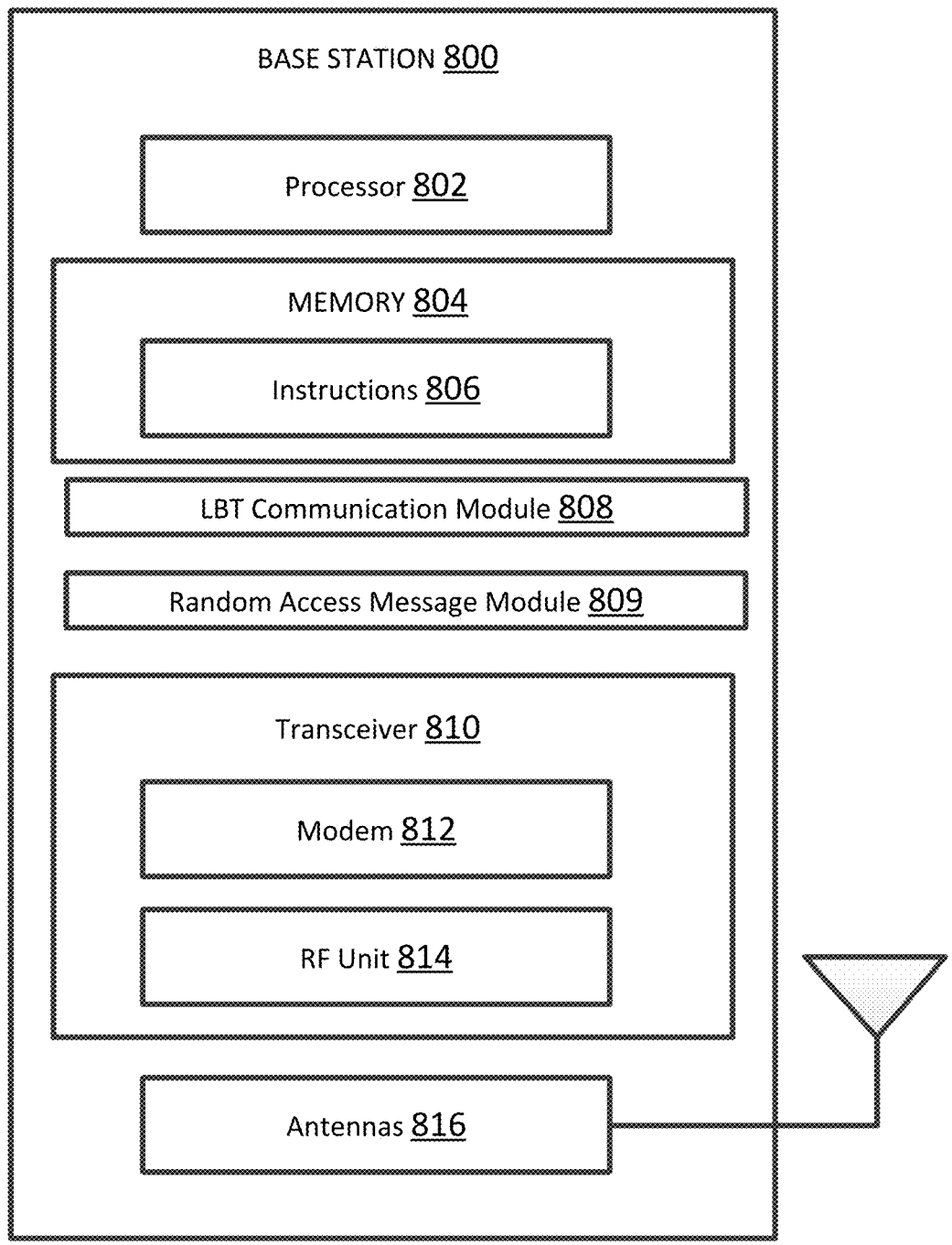
FIG. 8 is a block diagram of an exemplary base station (BS) according to embodiments of the present disclosure.

FIG. 8 is a block diagram of an exemplary BS 800 according to embodiments of the present disclosure. The BS 800 may be a BS 105 as discussed above. As shown, the BS 800 may include a processor 802, a memory 804, a LBT communication module 808, a random access message module 809, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 804 may include a non-transitory computer-readable medium. The memory 804 may store instructions 806. The instructions 806 may include instructions that, when executed by the processor 802, cause the processor 802 to perform operations described herein. Instructions 806 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the LBT communication module 808 and the random access message module 809 may be implemented via hardware, software, or combinations thereof. For example, each of the LBT communication module 808 and the random access message module 809 may be implemented as a processor, circuit, and/or instructions 806 stored in the memory 804 and executed by the processor 802. Each of the LBT communication module 808 and the random access message module 809 may be used for various aspects of the present disclosure.

The LBT communication module 808 is configured to communicate mode information for determining whether to perform a LBT mode for one or more random access message transmission procedure. The LBT communication module 808 transmits the mode information to one or more UEs. In some examples, the mode information is provided via a group-common PDCCH, a UL grant in a DL message (e.g., MSG 2 from the BS to the UE), and/or a DL grant for a DL message (e.g., MSG 2 from the BS to the UE or MSG 4 from the BS to the UE). Additionally, the LBT mode may be at least one of the category 2 LBT, category 4 LBT, or "no LBT" mode. The mode information may indicate the TXOP timing information such that the UE may determine the LBT mode for transmitting one or more random access messages. The random access message is at least one of random access preamble (MSG 1) or connection request (MSG 3), or ACK for connection response (MSG4).

In an example, the LBT communication module 808 receives a first set of RACH preambles from a first set of UEs and a second set of RACH preambles from a second set of UEs. In this example, the LBT communication module 808 communicates a first LBT mode for the first set of RACH preambles and communicates a second LBT mode for the second set of RACH preambles.

The random access message module 809 is configured to communicate a random access message based on the mode information. In an example, the random access message module 809 receives a random access message (e.g., MSG 1, MSG 3, and/or an ACK in response to MSG 4) from the UE 115. In another example, the random access message module 809 transmits a random access message (e.g., MSG 2 and/or MSG 4) to the UE 115.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or 400. The RF unit 814 may be further configured to perform analog beamforming in conjunction with the digital beamforming. Although shown as integrated together in transceiver 810, the modem subsystem 812 and the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The antennas 816 may include multiple antennas of similar or different designs in order to sustain multiple transmission links.

Figure 9:
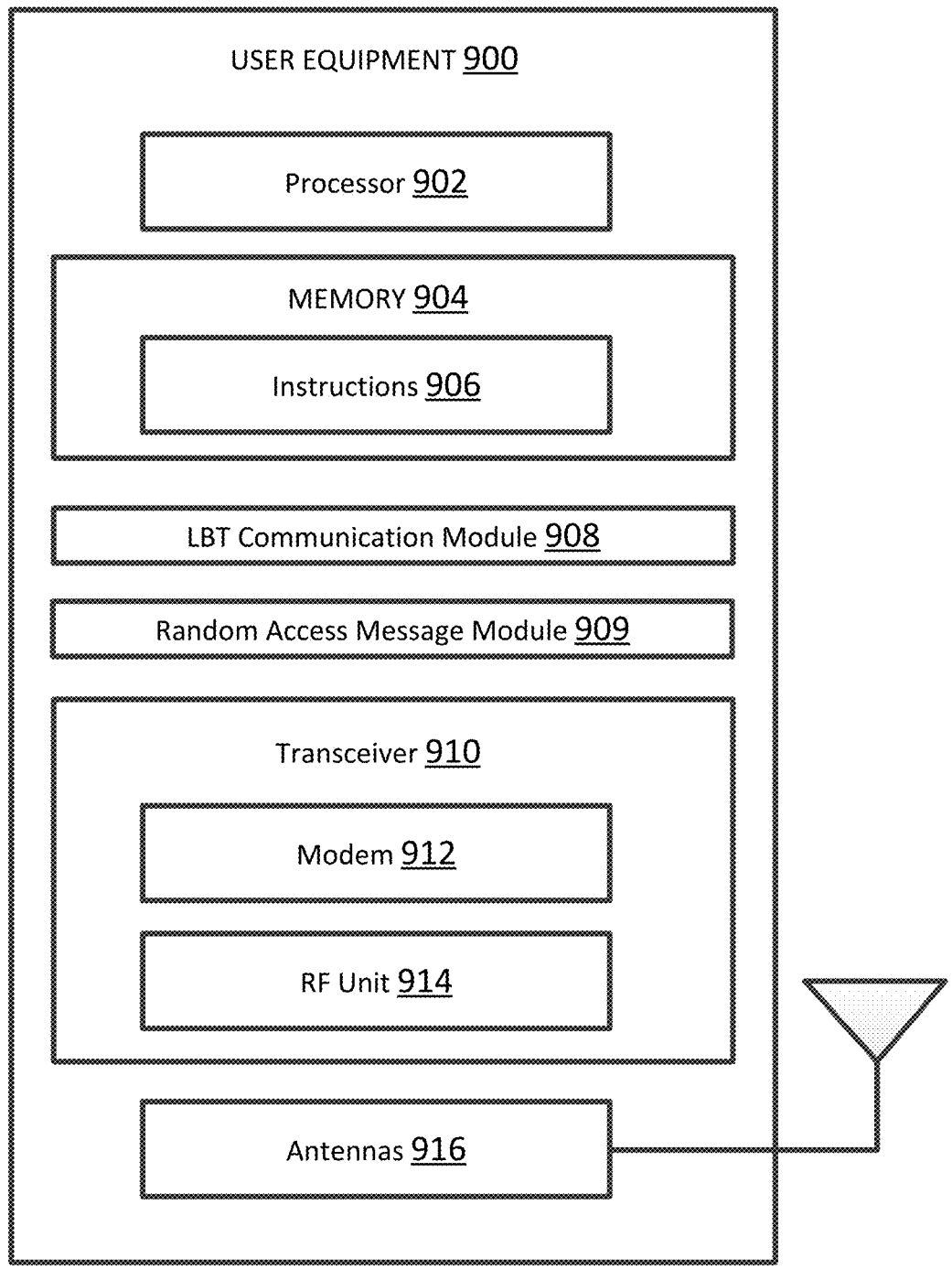
FIG. 9 is a block diagram of an exemplary user equipment (UE) according to embodiments of the present disclosure.

FIG. 9 is a block diagram of an exemplary UE 900 according to embodiments of the present disclosure. The UE 900 may be a UE 115 as discussed above. As shown, the UE 900 may include a processor 902, a memory 904, a LBT communication module 908, a random access message module 909, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 904 includes a non-transitory computer-readable medium. The memory 904 may store instructions 906. The instructions 906 may include instructions that, when executed by the processor 902, cause the processor 902 to perform the operations described herein with reference to the UEs 115 in connection with embodiments of the present disclosure. Instructions 906 may also be referred to as code, which may be interpreted broadly to include any type of computer-readable statement(s) as discussed above with respect to FIG. 8.

Each of the LBT communication module 908 and the random access message module 909 may be implemented via hardware, software, or combinations thereof. For example, each of the LBT communication module 908 and the random access message module 909 may be implemented as a processor, circuit, and/or instructions 906 stored in the memory 904 and executed by the processor 902. Each of the LBT communication module 908 and the random access message module 909 may be used for various aspects of the present disclosure.

The LBT communication module 908 is configured to communicate mode information for determining whether to perform a LBT mode for a random access procedure. The LBT communication module 908 receives the mode information from one or more BSs. In some examples, the mode information is provided via a group-common PDCCH, a UL grant in a DL message (e.g., MSG 2 from the BS to the UE), and/or a DL grant for a DL message (e.g., MSG 2 from the BS to the UE or MSG 4 from the BS to the UE). Additionally, the LBT mode may be at least one of the category 2 LBT, category 4 LBT, or "no LBT" mode. The mode information may indicate the TXOP timing information such that the UE may determine the LBT mode for transmitting one or more of the random access messages. The UE may select, based on the mode information, the LBT mode. The random access message is at least one of random access preamble (MSG 1) or connection request (MSG 3), or ACK for connection response (MSG4).

The random access message module 909 is configured to communicate a random access message based on the mode information. In an example, the random access message module 809 receives a random access message (e.g., MSG 2 and/or MSG 4) from the BS 105. In another example, the random access message module 809 transmits a random access message (e.g., MSG 1, MSG 3, and/or an ACK in response to MSG 4) to the BS 105.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904, the LBT communication module 908, and/or the random access message module 909 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The antennas 916 may include multiple antennas of similar or different designs in order to sustain multiple transmission links. The RF unit 914 may configure the antennas 916.

In NR, the UE 115 may select a frequency band of a plurality of frequency bands and communicate random access messages on the selected frequency band. A first frequency band may be a primary UL and a second frequency band may be a supplemental UL (SUL). The primary UL may be associated with the primary DL band, in which the BS 105 transmits the system information (e.g. SSBs and PBCH). The BS 105 may advertise information about the SUL band in the system information (e.g. RMSI) of the primary DL band. Additionally, one of the first frequency band and the second frequency band may be in a licensed frequency band (e.g., SUL), and the other one of the first frequency band and the second frequency band may be in an unlicensed frequency band (e.g., primary UL). In NR, the UE 115 transmits both the MSG 1 and MSG 3 on the same frequency band (e.g., same UL carrier). Accordingly, if the UE 115 transmits the MSG 1 in the first frequency band, the UE 115 is unable to transmit the MSG 3 in the second frequency band.

If both the first and second frequency bands are in a licensed frequency band, the UE 115 will be able to transmit RACH messages without needing to perform LBT. If, however, the UE 115 transmits MSG 1 on an unlicensed frequency band (e.g., primary UL carrier), transmission of the MSG 3 on the unlicensed frequency band may be gated by LBT. Accordingly, the UE 115 may be blocked for a significant amount of time from transmitting on the unlicensed frequency band because other devices are grabbing the medium and the UE 115 is unable to secure channel access. The UE 115 may have selected the unlicensed frequency band for transmission of the MSG 1 due to a better path loss measurement compared to the licensed frequency band. The UE 115 may determine path loss measurements on the DL between the first and second frequency bands. To improve performance, it may be desirable for the UE 115 to transmit the MSG 3 on the unlicensed SUL to speed up network connectivity. In particular, it may be desirable to allow the UE 115 to transmit a message (e.g., the MSG 1) on the unlicensed frequency band and subsequently switch to the licensed frequency band for transmission of another message (e.g., MSG 3).

Initially, the BS 105 may be unaware of the capabilities of a UE 115 and in particular, whether the UE 115 is capable of carrier aggregation. As discussed in more detail below, the BS 105 and/or UE 115 may overcome the aforementioned problem in a variety of ways.

In some examples, a first wireless communication device communicates with a second wireless communication device, configuration information for selecting between a first frequency band and a second frequency band. One of the first frequency band and the second frequency band may be in a licensed frequency band (e.g., SUL carrier), the other one of the first frequency band and the second frequency band may be in an unlicensed frequency band (e.g., primary UL carrier).

In an example, the first wireless communication device is the BS 105, the second wireless communication device is the UE 115, and the configuration information includes a measurement threshold (e.g., Reference Signal Received Power (RSRP) threshold) associated with traffic load in the first and second frequency bands. The BS 105 may broadcast configuration information for the SUL carrier. In an example, the RSRP threshold is advertised by the RMSI, and the BS 105 updates the RMSI information periodically (e.g., once every 80 ms or longer), depending on how often the network load fluctuates. Accordingly, the RSRP threshold may change dynamically over time. When the BS 105 configures the RSRP threshold value, the BS 105 may take the carrier center frequency of the first frequency band and the second frequency band and the beamforming used for communications in the first frequency band and the second frequency band into account. For example, the BS may perform more beamforming in a mmWave frequency band than in a low-frequency non-mm Wave band. The RSRP threshold may be based on the path loss difference between the two frequency bands (primary UL carrier and SUL carrier) and may be a function of the carrier frequency so that the propagation path loss may be computed based on the carrier frequency difference.

Additionally, the BS may take into account some nominal beamforming gain differences on the UE side. Furthermore, the BS may take the network load into account when configuring the RSRP threshold. For example, if the BS detects a high network load, the BS may set the RSRP threshold to be higher so that a majority of the UEs are more likely to select the SUL for the random access procedures. If network load is low, more resources may be available to the UEs on the unlicensed frequency band, and the RSRP threshold may be configured to be lower so that more UEs may select the unlicensed frequency band for random access.

In an example, the first wireless communication device is the UE 115, the second wireless communication device is the BS 105, and the configuration information is the measurement threshold. In this example, the UE 115 may receive configuration information from the BS 105. The UE 115 selects a particular SUL carrier for initial access if the RSRP measured by the UE on the DL carrier where the UE receives the RMSI is lower than the threshold. Accordingly, if the RSRP measurement exceeds the threshold, then the UE may transmit MSG 1 and MSG 3 on the SUL. RSRP is a RSSI type of measurement and is defined as the linear average over the power contributions of the resource elements that carry cell-specific reference signals with the considered measurement frequency bandwidth. The reference point for the RSRP may be the antenna connector of the UE. Other metrics for measurement are within the scope of the disclosure.

The first wireless communication device communicates with the second wireless communication device, a random access preamble in a first frequency band based on at least the configuration information. In an example, the first wireless communication device is the BS 105, the second wireless communication device is the UE 115, and the random access preamble is included in the MSG 1. In this example, the BS 105 receives the MSG 1 in the first frequency band from the UE 115. In another example, the first wireless communication device is the UE 115, the second wireless communication device is the BS 105, and the random access preamble is included in the MSG 1. In this example, the UE 115 transmits the MSG 1 in the first frequency band to the BS 105.

The first wireless communication device communicates with the second wireless communication device, a connection request message in a second frequency band. In an example, the first wireless communication device is the BS 105, the second wireless communication device is the UE 115, and the MSG 3 includes the connection request message and corresponds to the MSG 1. In this example, the BS 105 receives the MSG 3 in the second frequency band from the UE 115. In another example, the first wireless communication device is the UE 115, the second wireless communication device is the BS 105, and the MSG 3 includes the connection request message and corresponds to the MSG 1. In this example, the UE 115 transmits the MSG 3 in the second frequency band to the BS 105.

Figure 10:
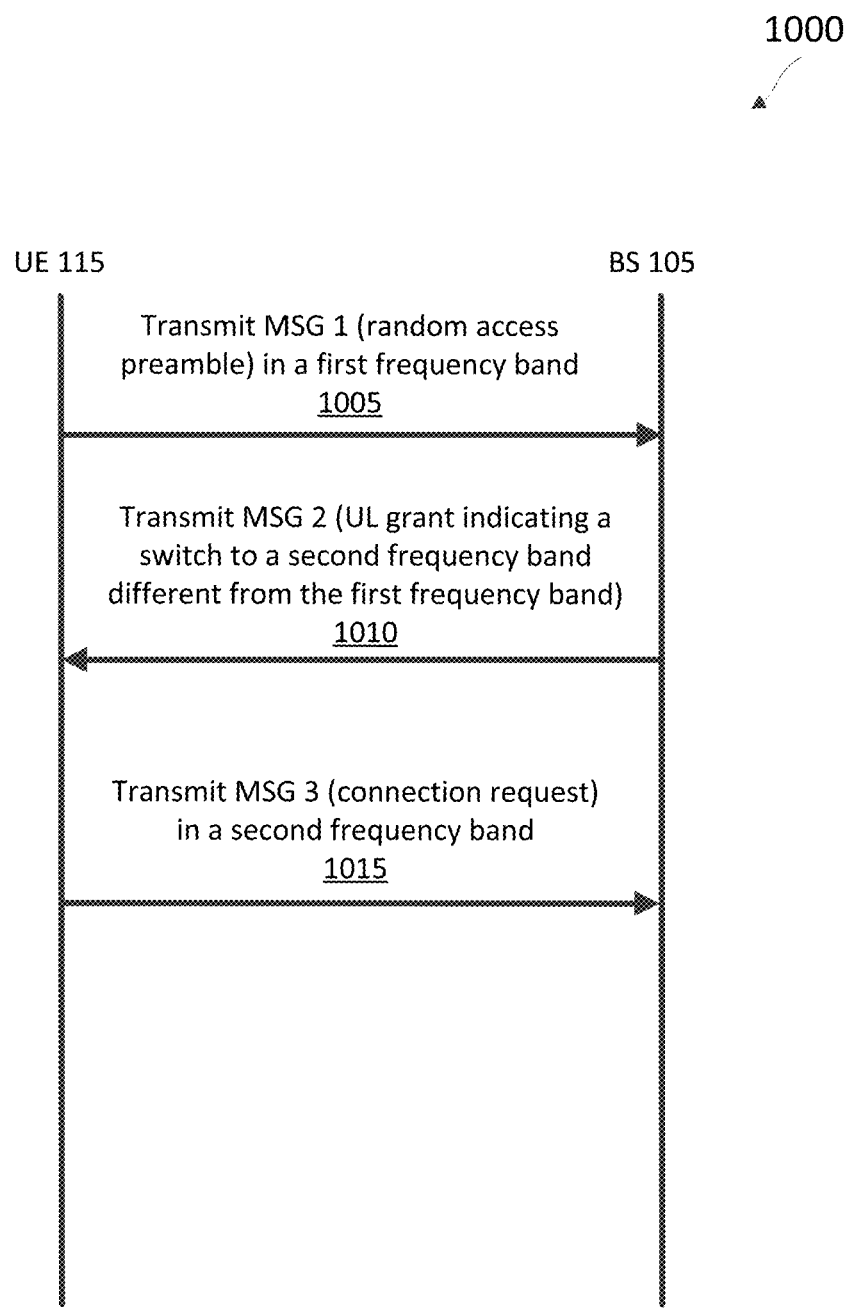
FIG. 10 is a protocol diagram of a method of communicating an indication to switch an UL carrier according to embodiments of the present disclosure.

FIG. 10 is a protocol diagram of a method 1000 of communicating an indication to switch an UL carrier according to embodiments of the present disclosure. Steps of the method 1000 can be executed by computing devices (e.g., a processor, processing circuit, and/or other suitable component) of wireless communication devices, such as the BS 105 and the UE 115. As illustrated, the method 1000 includes a number of enumerated steps, but embodiments of the method 1000 may include additional steps before, after, and in between the enumerated steps. In some embodiments, one or more of the enumerated steps may be omitted or performed in a different order. The method 1000 illustrates one BS 105 and one UE 115 for purposes of simplicity of discussion, though it will be recognized that embodiments of the present disclosure may scale to many more UEs 115 and/or BSs 105.

At step 1005, the UE 115 transmits a MSG 1 including a random access preamble in a first frequency band (e.g., an unlicensed UL carrier). The BS 105 receives the MSG 1.

At step 1010, the BS 105 transmits a MSG 2, which carries a UL grant for a MSG 3 in the data portion of the MSG 2. The UL grant includes an indication to switch to another frequency band different from the first frequency band. In this example, the BS 105 provides the UL grant to the UE 115, and the UL grant included in the RAR provides an indication to the UE 115 switch from the first frequency band to another frequency band (e.g., the second frequency band, which is a licensed UL carrier) for transmission of the MSG 3. In an example, the UL is an indication to the UE 115 to select a frequency band different from the first frequency band and switch to the selected frequency band for transmission of the MSG 3. The MSG 1 and MSG 2 may be transmitted in the same or different TXOPs. The UE 115 receives the MSG 2.

The BS 105 may transmit an indication to the UE 115 to switch from the first frequency band to another frequency band for the MSG 3 transmission based on a variety of reasons. For example, if transmission of the MSG 3 is outside the TXOP in the first frequency band (e.g. on the primary UL carrier) and/or the UE 110 determines to perform a category 4 LBT before transmitting the MSG 3, the BS 105 may transmit an indication to the UE 115 to transmit the MSG 3 in another frequency band (e.g., on the SUL carrier, which is a licensed UL carrier). The BS 105 may transmit to the UE a MSG 2, which carries an indication to the UE 115 to transmit the MSG 3 in a second frequency band rather than performing the category 4 LBT on the first frequency band for the MSG 3 transmission.

In some examples, the BS 105 may distribute the load across the first frequency band and the second frequency band, and further control in which frequency band a UE transmits the MSG 3. For example, the BS 105 may transmit to a first set of UEs a MSG 2, which carries an indication to the UE 115 to transmit the MSG 3 in a second frequency band rather than performing the category 4 LBT on the first frequency band for the MSG 3 transmission. Additionally, the BS 105 may transmit to a second set of UEs a MSG 2, which carries an indication to the UE 115 to perform the category 2 LBT on the first frequency band for MSG 3 transmission.

At step 1015, the UE 115 transmits the MSG 3 including a connection request message in a second frequency band. The BS 105 receives the MSG 3.

Figure 11:
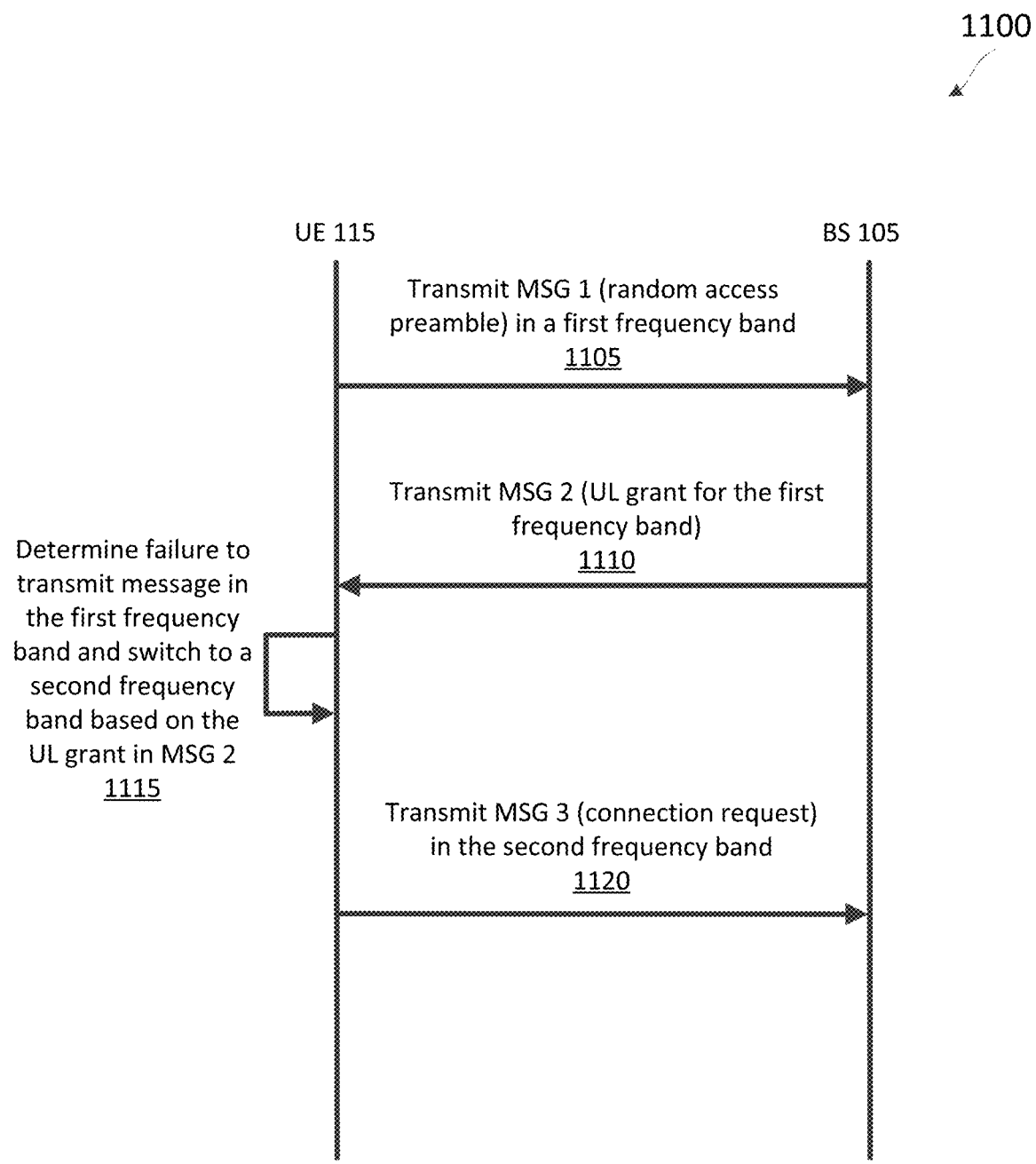
FIG. 11 is a protocol diagram of a method of communicating an UL grant associated with a second frequency band according to embodiments of the present disclosure.

FIG. 11 is a protocol diagram of a method 1100 of communicating an UL grant associated with a second frequency band according to embodiments of the present disclosure. Steps of the method 1100 can be executed by computing devices (e.g., a processor, processing circuit, and/or other suitable component) of wireless communication devices, such as the BS 105 and the UE 115. As illustrated, the method 1100 includes a number of enumerated steps, but embodiments of the method 1100 may include additional steps before, after, and in between the enumerated steps. In some embodiments, one or more of the enumerated steps may be omitted or performed in a different order. The method 1100 illustrates one BS 105 and one UE 115 for purposes of simplicity of discussion, though it will be recognized that embodiments of the present disclosure may scale to many more UEs 115 and/or BSs 105.

At step 1105, the UE 115 transmits a MSG 1 including a random access preamble in a first frequency band. The BS 105 receives the MSG 1.

At step 1110, the BS 105 transmits a MSG 2, which carries a UL grant for the first frequency band. In this example, the BS 105 provides the UL grant in the RAR to the UE 115. The MSG 1 and MSG 2 may be transmitted in the same or different TXOPs. The UE 115 receives the MSG 2. The time domain resource allocation between the first and second frequency bands may have an offset, which can be signaled in the UL grant in the RAR.

The UE 115 may perform LBT before transmitting the MSG 3. At step 1115, the UE 115 determines a failure to transmit MSG 3 in the first frequency band (after a particular number of failed attempts) and accordingly switches to a second frequency band based on the UL grant in step 1110 for transmission of the MSG 3. At step 1120, the UE 115 transmits the MSG 3 including a connection request message in the second frequency band. The BS 105 receives the MSG 3.

Figure 12:
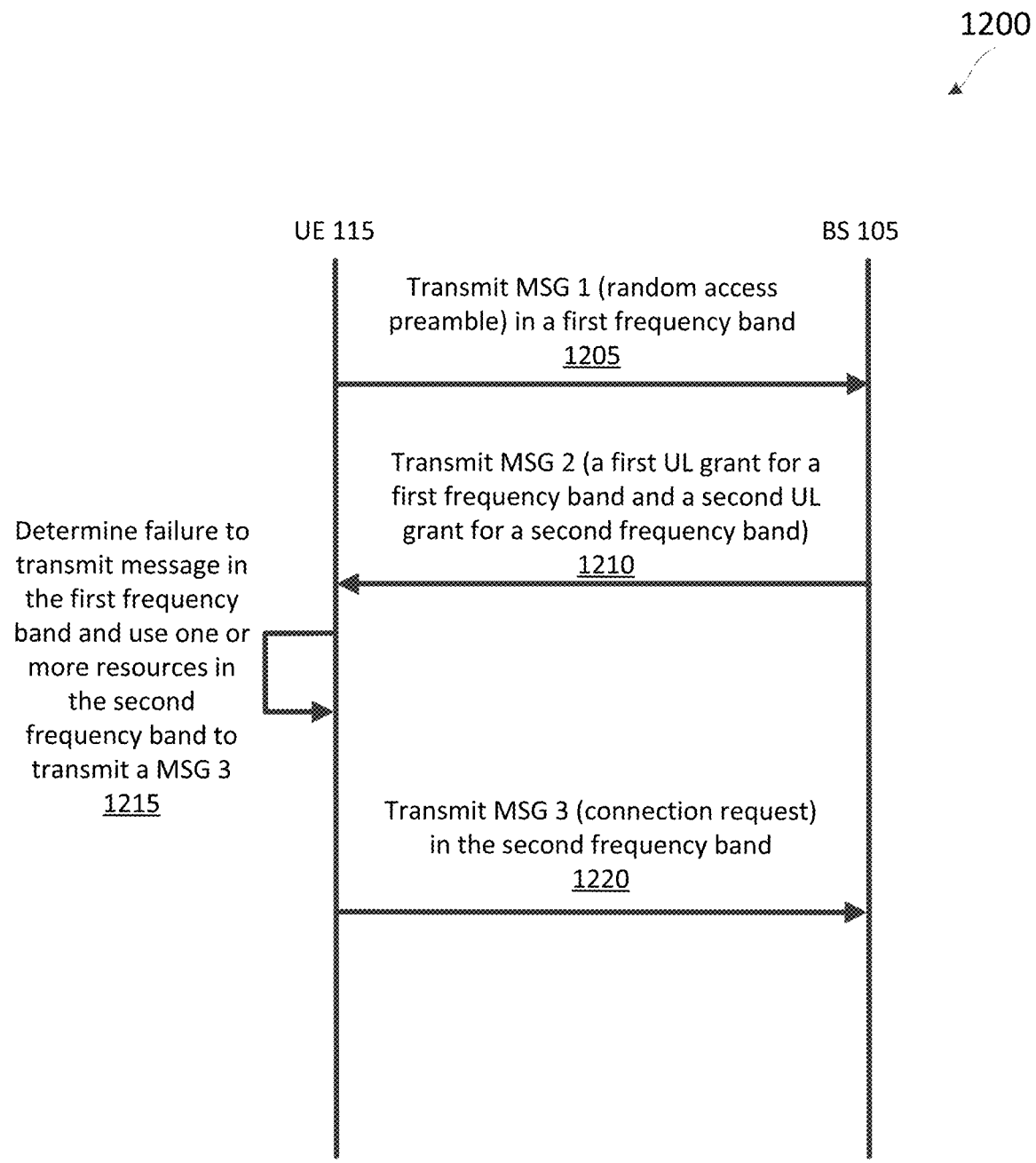
FIG. 12 is a protocol diagram of a method of communicating two UL grants in relation to frequency band switching according to embodiments of the present disclosure.

Referring to FIGS. 10 and 11, the BS 105 transmits a single UL grant in the RAR, but this is not intended to be limiting. FIG. 12 is a protocol diagram of a method 1200 of communicating two UL grants in relation to frequency band switching according to embodiments of the present disclosure. Steps of the method 1200 can be executed by computing devices (e.g., a processor, processing circuit, and/or other suitable component) of wireless communication devices, such as the BS 105 and the UE 115. As illustrated, the method 1200 includes a number of enumerated steps, but embodiments of the method 1200 may include additional steps before, after, and in between the enumerated steps. In some embodiments, one or more of the enumerated steps may be omitted or performed in a different order. The method 1200 illustrates one BS 105 and one UE 115 for purposes of simplicity of discussion, though it will be recognized that embodiments of the present disclosure may scale to many more UEs 115 and/or BSs 105.

At step 1205, the UE 115 transmits a MSG 1 including a random access preamble in a first frequency band. The first frequency band may be in an unlicensed frequency band (e.g., the primary UL). The BS 105 receives the MSG 1.

At step 1210, the BS 105 transmits a MSG 2, which carries a first UL grant for a first frequency band and a second UL grant for a second frequency band. The second frequency band may be in a licensed frequency band (e.g. SUL). In this example, the BS 105 provides the two UL grants in the RAR to the UE 115. The MSG 1 and MSG 2 may be transmitted in the same or different TXOPs. The UE 115 receives the MSG 2.

The UE 115 may perform LBT before transmitting the MSG 3. At step 1215, the UE 115 determines a failure to transmit MSG 3 in the first frequency band (after a particular number of failed attempts to transmit in the first frequency band) and accordingly uses one or more resources in the second frequency band to transmit the MSG 3. At step 1220, the UE 115 transmits the MSG 3 including a connection request message in the second frequency band. The BS 105 receives the MSG 3. In this example, the BS 105 may overprovision by sending out multiple grants to the UE 115, and the UE 115 may default to the standalone procedures by attempting to transmit the MSG 3 in the first frequency band.

Upon failure detection at step 1215, the UE 115 may utilize the second UL grant for the second frequency band.

Alternatively, after step 1210, rather than the UE 115 determining a failure to transmit the MSG 3 in the first frequency band (as discussed in step 1215 above), the UE 115 may successfully grab the unlicensed medium after LBT. In this situation, the UE 115 may use the first UL grant for the first frequency band to transmit the MSG 3, thus transmitting the MSG 3 in the first frequency band. Accordingly, it may be unnecessary for the UE 115 to transmit the MSG 3 in the second frequency band (as discussed in step 1220 above).

If the RSRP measured by the UE on the DL carrier where the UE receives the RMSI is above the configured RSRP threshold, the UE 115 uses the primary UL carrier (non-SUL carrier). Otherwise, the UE 115 uses the SUL carrier for transmission of the random access messages. The BS 105 may take the network load into account when configuring the RSRP threshold.

In some examples, the UE 115 decides in which frequency band to transmit MSG 1 and/or MSG 3. The UE 115 may take into account various factors in making this determination, such as the UE load and/or the network load. Accordingly, some UEs may be pushed from transmitting on the first frequency band to another frequency band based on the load perceived by the UE. The present disclosure provides support for a signaling mechanism that allows the UE 115 to change the UL carrier when transmitting one or more random access messages in a random access procedure. If the UE 115 desires to switch frequency bands, the UE 115 may transmit a signal indicating such to the BS 105.

In an example, the BS 105 allows the UE 115 to change the UL carrier based on the interference experienced on the UE side. In an example, the UE 115 may follow the BS 105's guidance for transmission of the MSG 1 in a particular frequency band. After the UE 115 transmits MSG 1, the UE 115 reevaluates and may desire to transmit a subsequent random access message (e.g., the MSG 3 or an ACK in response to MSG 4) in the random access procedure in another frequency band. In some examples, the UE 115 may take the RSRP threshold provided by the BS 105 and/or the load behavior from the UE 115's perspective (which may be different from the BS 105's estimation of the load) into account for determining whether to switch to a different frequency band for transmission of subsequent messages. Additionally, the MSG 3 may have a heavy payload. Accordingly, the UE 115 may desire to transmit the MSG 1 on the unlicensed frequency band and indicate its preference to switch to the licensed frequency band for transmission of the MSG 3.

In some examples, the UE 115 uses the MSG 1 to indicate a desire to switch from an unlicensed carrier to a licensed carrier and accordingly transmit random access messages on the licensed carrier. In response the receiving the MSG 1, the BS 105 may allow the UE 115 to switch carriers and may transmit an indication in the MSG 2 (e.g., in UL grant in RAR) to schedule UL resources for transmission of the MSG 3 on the licensed carrier. The BS 105 uses the MSG 2 to acknowledge that the UE 115 is switching carriers. Thereafter, the UE 115 may transmit random access messages in a random access procedure using the SUL based on the UL grant included in the MSG 2.

Figure 13:
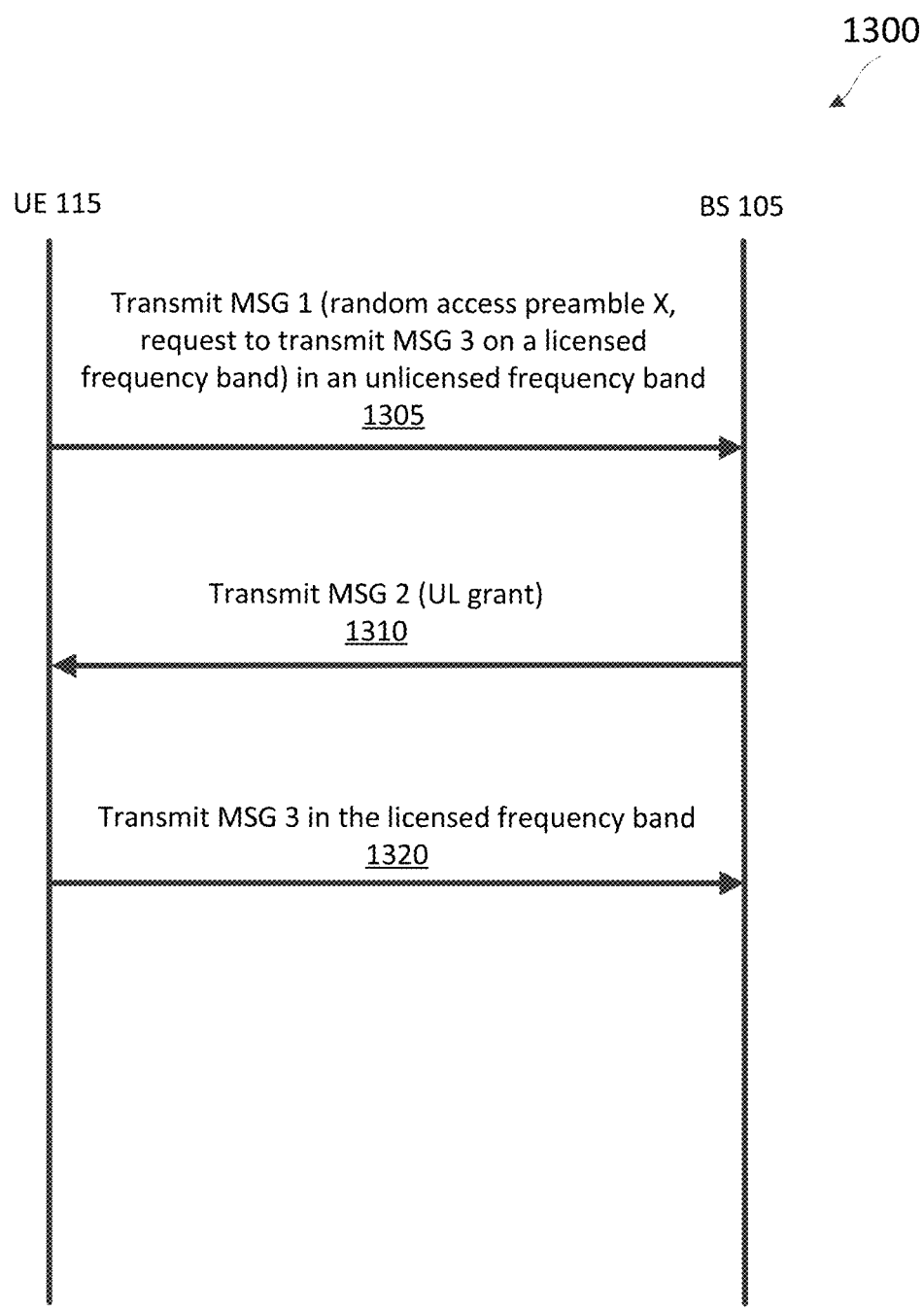
FIG. 13 is a protocol diagram of a method of communicating a request to transmit a random access message in a licensed frequency band according to embodiments of the present disclosure.

FIG. 13 is a protocol diagram of a method 1300 of communicating a request to transmit a random access message in a licensed frequency band according to embodiments of the present disclosure. Steps of the method 1300 can be executed by computing devices (e.g., a processor, processing circuit, and/or other suitable component) of wireless communication devices, such as the BS 105 and the UE 115. As illustrated, the method 1300 includes a number of enumerated steps, but embodiments of the method 1300 may include additional steps before, after, and in between the enumerated steps. In some embodiments, one or more of the enumerated steps may be omitted or performed in a different order. The method 1300 illustrates one BS 105 and one UE 115 for purposes of simplicity of discussion, though it will be recognized that embodiments of the present disclosure may scale to many more UEs 115 and/or BSs 105.

At step 1305, the UE 115 transmits a MSG 1 in an unlicensed frequency band. The MSG 1 includes a random access preamble X and a request to transmit one or more subsequent random access messages (e.g., MSG 3) in a licensed frequency band (e.g., SUL carrier). The preamble space may be divided into multiple parts, and the UE 115's selection of a particular preamble signals the UE 115's UL carrier preference for subsequent transmission of random access messages. In an example, the UE 115 includes a RACH preamble X belonging to a first subset of preambles in the MSG 1 to indicate a preference for the licensed UL carrier (e.g., SUL carrier) and includes a RACH preamble Y belonging to a second subset of preambles in the MSG 1 to indicate a preference for the unlicensed UL carrier. The BS 105 receives the MSG 1.

At step 1310, the BS 105 transmits the MSG 2 (e.g., in UL grant in RAR) to schedule UL resources for transmission of the MSG 3 in the licensed frequency band. The MSG 1 and MSG 2 may be transmitted in the same or different TXOPs. The UE 115 receives the MSG 2. At step 1315, the UE 115 transmits the MSG 3 in the licensed frequency band.

Figure 14:
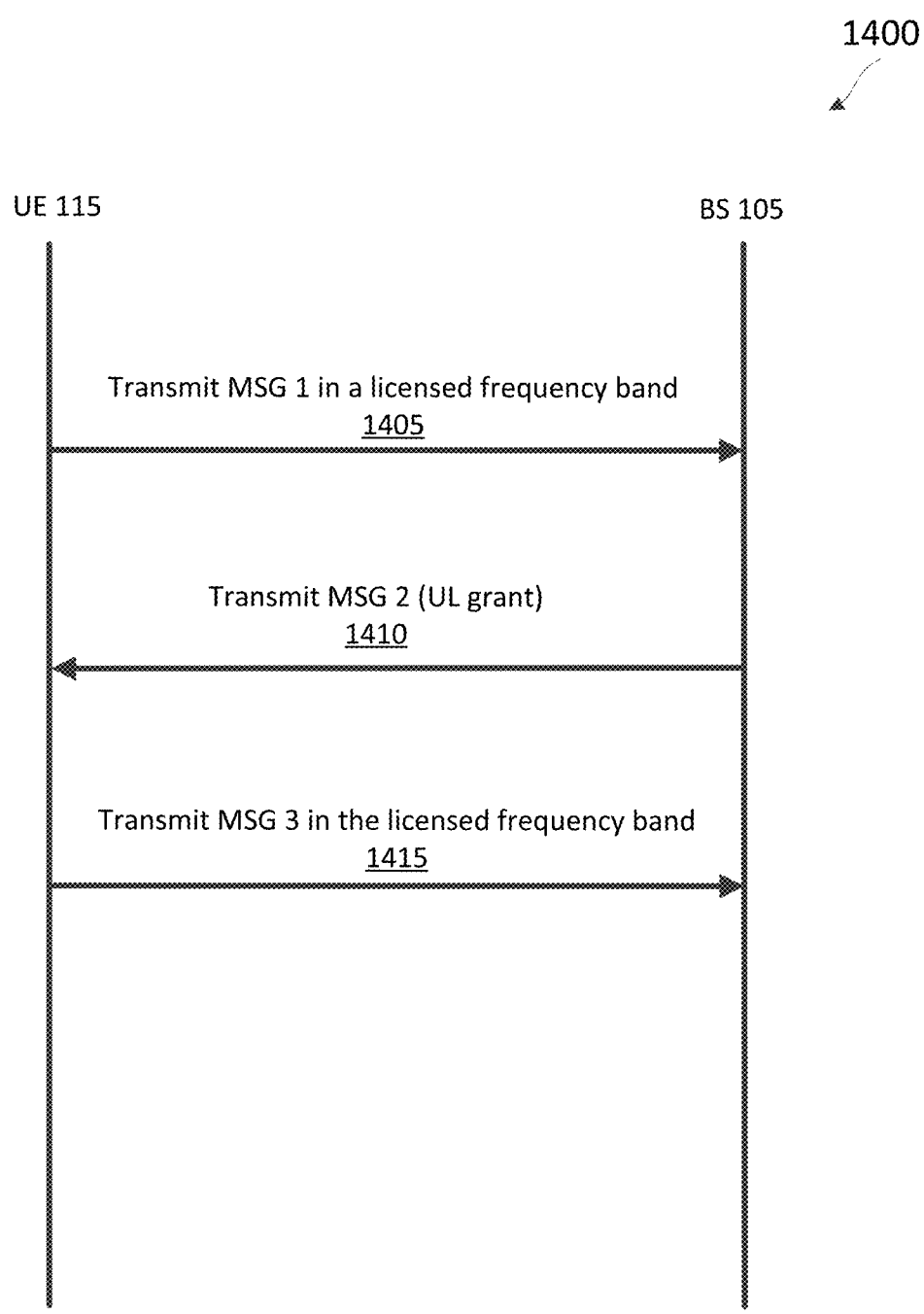
FIG. 14 is a protocol diagram of a method of communicating an intention to transmit a random access message in a licensed frequency band according to embodiments of the present disclosure.

FIG. 14 is a protocol diagram of a method 1400 of communicating an intention to transmit a random access message in a licensed frequency band according to embodiments of the present disclosure. Steps of the method 1400 can be executed by computing devices (e.g., a processor, processing circuit, and/or other suitable component) of wireless communication devices, such as the BS 105 and the UE 115. As illustrated, the method 1400 includes a number of enumerated steps, but embodiments of the method 1400 may include additional steps before, after, and in between the enumerated steps. In some embodiments, one or more of the enumerated steps may be omitted or performed in a different order. The method 1400 illustrates one BS 105 and one UE 115 for purposes of simplicity of discussion, though it will be recognized that embodiments of the present disclosure may scale to many more UEs 115 and/or BSs 105.

At step 1405, the UE 115 transmits a MSG 1 in a licensed frequency band (e.g., SUL carrier). Transmission of the MSG 1 in the licensed frequency band provides the UE 115's intention to transmit one or more subsequent random access messages (e.g., MSG 3) in the licensed frequency band. The UE 115 may transmit this MSG 1 even if the BS 105's guidance (according to RSRP threshold) instructs the UE 115 to the unlicensed UL carrier for message transmission.

Upon reception of MSG 1 in the licensed frequency band, at step 1410, the BS 105 transmits a MSG 2 (e.g., in UL grant in RAR) to schedule UL resources for transmission of the MSG 3 in the licensed frequency band. The MSG 1 and MSG 2 may be transmitted in the same or different TXOPs. The UE 115 receives the MSG 2. At step 1415, the UE 115 transmits the MSG 3 in the licensed frequency band.

Figure 15:
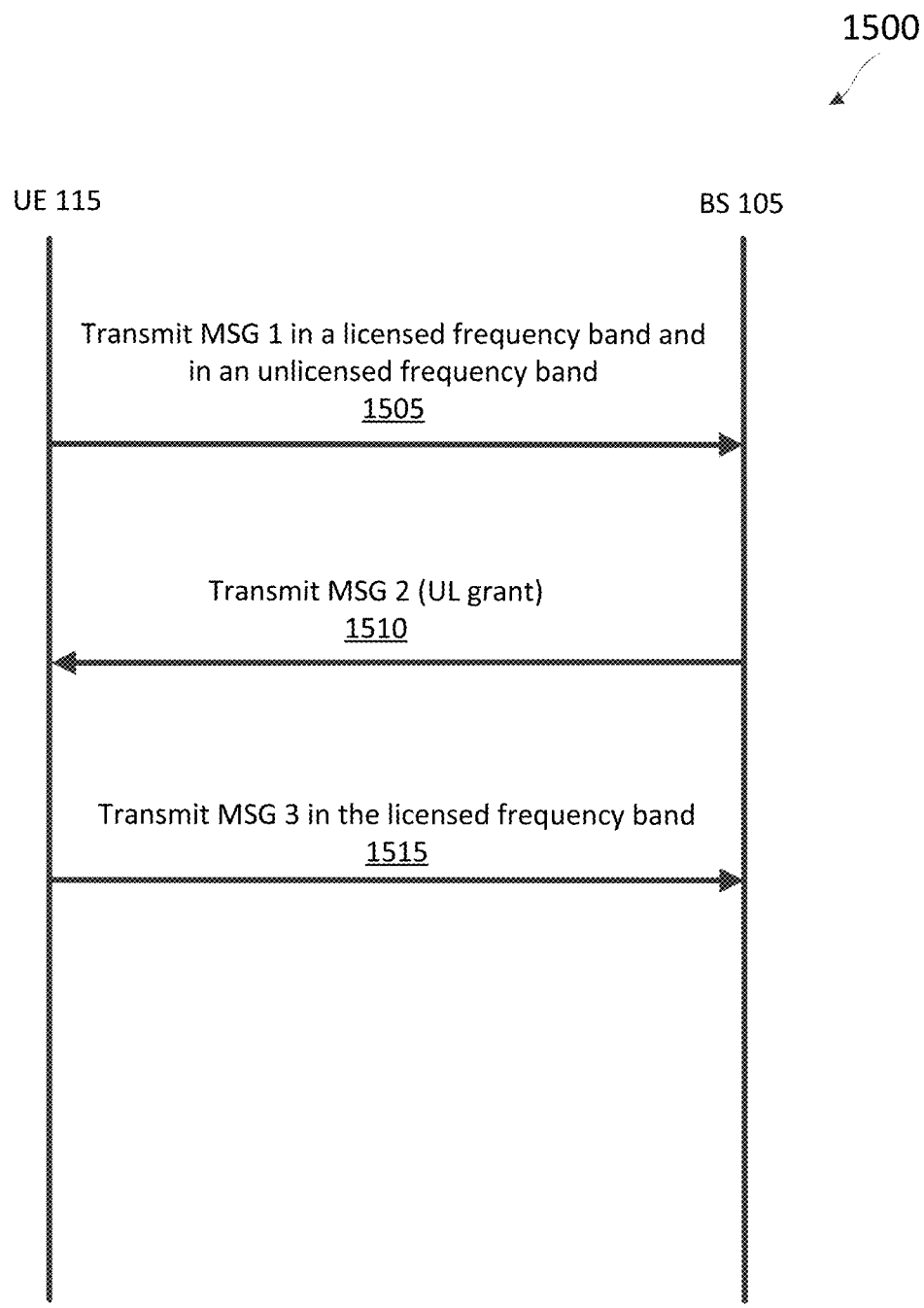
FIG. 15 is a protocol diagram of a method of communicating a random access message both in the unlicensed frequency band and the licensed frequency band according to embodiments of the present disclosure.

FIG. 15 is a protocol diagram of a method 1500 of communicating a random access message both in the unlicensed frequency band and the licensed frequency band according to embodiments of the present disclosure. Steps of the method 1500 can be executed by computing devices (e.g., a processor, processing circuit, and/or other suitable component) of wireless communication devices, such as the BS 105 and the UE 115. As illustrated, the method 1500 includes a number of enumerated steps, but embodiments of the method 1500 may include additional steps before, after, and in between the enumerated steps. In some embodiments, one or more of the enumerated steps may be omitted or performed in a different order. The method 1500 illustrates one BS 105 and one UE 115 for purposes of simplicity of discussion, though it will be recognized that embodiments of the present disclosure may scale to many more UEs 115 and/or BSs 105.

At step 1505, the UE 115 transmits a MSG 1 in a licensed frequency band (e.g., SUL carrier) and an unlicensed frequency band (e.g., primary UL carrier). By transmitting the MSG 1 in both the licensed and unlicensed frequency bands, the UE 115 may indicate its preference for the licensed frequency band and additionally provide more robustness in the MSG 1 reception. In an example, a one-to-one correspondence between the PRACH resources (including RACH occasions and preambles) exists between unlicensed and licensed carriers. If the BS 105 detects a preamble X on RACH occasion A on the unlicensed frequency band and preamble Y on RACH occasion B on the licensed frequency band or detects preamble Y on the licensed frequency band, the BS 105 may determine that the UE 115 prefers the licensed frequency band. One RACH attempt on both channels may be mapped to two hypotheses (unlicensed UL, preamble x on RACH occasion A) and (licensed UL, preamble y on RACH occasion B). Based on using the resource hypotheses to indicate the UE 115's preference, the BS 105 may figure out which channel the UE 115 will use for the next random access message transmission.

It may be desirable for the BS 105 to distinguish between a single UE transmitting MSG 1 on both UL resources and two different UEs transmitting MSG 1 using each of these UL resources. In an example, the BS 105 partitions the RACH resources and limits the resource space such that some resources are used for this diversity operation and others are used for single MSG 1 transmissions. Accordingly, if the BS 105 detects MSG 1 transmissions in a particular part of the resource space, the BS 105 may determine that the transmission is from a single UE.

At step 1510, the BS 105 transmits a MSG 2 (e.g., in UL grant in RAR) to schedule UL resources for transmission of the MSG 3 on the licensed frequency band. The MSG 1 and MSG 2 may be transmitted in the same or different TXOPs. The UE 115 receives the MSG 2. At step 1515, the UE 115 transmits the MSG 3 in the licensed frequency band.

It should be understood that although switching of frequency bands was discussed in relation to the MSG 1 and MSG 3, this is not intended to be limiting, and the methods 1000, 1100, 1200, 1300, 1400, and/or 1500 may be applied to and/or between any of the random access messages. For example, the methods 1000, 1100, 1200, 1300, 1400, and/or 1500 may be applied between MSG 3 and the ACK for the MSG 4 and between MSG 1 and the ACK for the MSG 4.

Figure 16:
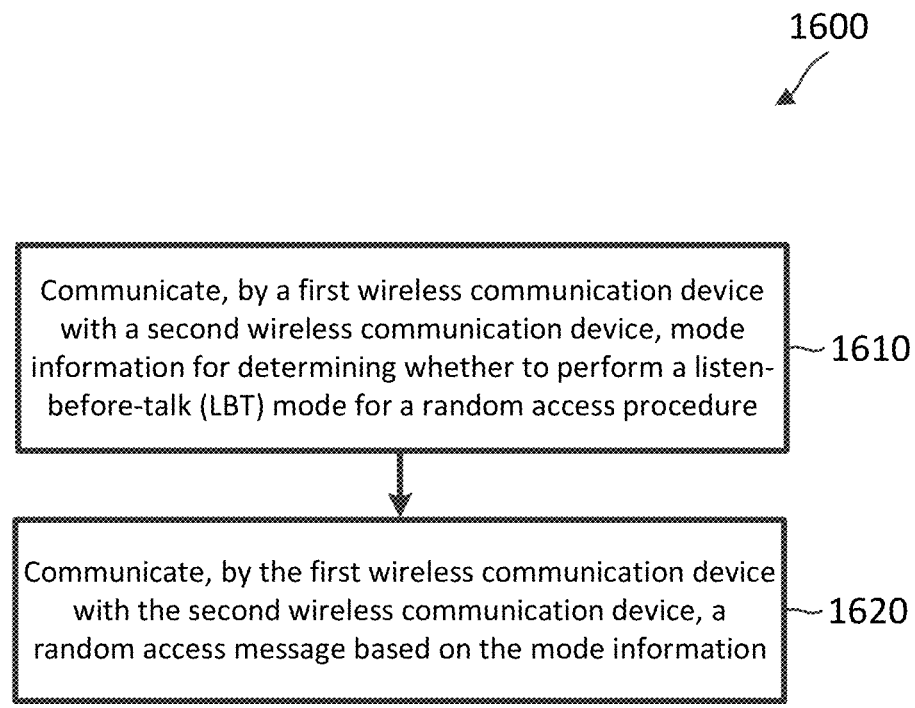
FIG. 16 is a flow diagram of a random access message communication method according to embodiments of the present disclosure.

FIG. 16 is a flow diagram of a random access message communication method 1600 according to embodiments of the present disclosure. Steps of the method 1600 can be executed by a computing device (e.g., a processor, processing circuit, and/or other suitable component) or other suitable means for performing the steps. For example, a UE, such as the UE 115 or UE 900, may utilize one or more components, such as the processor 902, the memory 904, the LBT communication module 908, the random access message module 909, and the transceiver 910, to execute the steps of method 1600. In another example, a BS, such as the BS 105 or BS 800, may utilize one or more components, such as the processor 802, the memory 804, the LBT communication module 808, the random access message module 809, and the transceiver 810, to execute the steps of method 1600. The method 1600 may employ similar mechanisms as in the methods 500, 600, and/or 700 described with respect to FIGS. 5, 6, and/or 7, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes communicating, by a first wireless communication device with a second wireless communication device, mode information for determining whether to perform a LBT mode for a random access procedure. In an example, the first wireless communication device is the BS 105, the second wireless communication device is the UE 115, and the mode information is provided via a group-common PDCCH, a UL grant in a DL message (e.g., MSG 2 from the BS to the UE), and/or a DL grant for a DL message (e.g., MSG 2 from the BS to the UE or MSG 4 from the BS to the UE). The BS 105 transmits the mode information to the UE 115.

In an example, the first wireless communication device is the BS 105, the second wireless communication device is the UE 115, and the mode information is provided via a group-common PDCCH, a UL grant in a DL message (e.g., MSG 2 from the BS to the UE), and/or a DL grant for a DL message (e.g., MSG 2 from the BS to the UE or MSG 4 from the BS to the UE). The BS 105 transmits the mode information to the UE 115. Additionally, the LBT mode may be at least one of the category 2 LBT, category 4 LBT, or "no LBT" mode. The mode information may indicate the TXOP timing information such that the UE may determine the LBT mode for transmitting one or more random access messages. The random access message is at least one of random access preamble (MSG 1) or connection request (MSG 3), or ACK for connection response (MSG4).

In another example, the first wireless communication device is the UE 115, the second wireless communication device is the BS 105, and the mode information is provided group-common PDCCH, a UL grant in a DL message (e.g., MSG 2 from the BS to the UE), and/or a DL grant for a DL message (e.g., MSG 2 from the BS to the UE or MSG 4 from the BS to the UE). The UE 115 transmits the mode information to the BS 105. Additionally, the LBT mode may be at least one of the category 2 LBT, category 4 LBT, or "no LBT" mode. The mode information may indicate the TXOP timing information such that the UE may determine the LBT mode for transmitting one or more of the random access messages. The UE may select, based on the mode information, the LBT mode. The random access message is at least one of random access preamble (MSG 1) or connection request (MSG 3), or ACK for connection response (MSG4).

At step 1620, the method 1600 includes communicating, by the first wireless communication device with the second wireless communication device, a random access message based on the mode information.

In some examples, the first wireless communication device is the BS 105, and the second wireless communication device is the UE 115. The BS 105 receives a random access message (e.g., MSG 1, MSG 3, and/or an ACK in response to MSG 4) from the UE 115 and transmits a random access message (e.g., MSG 2 and/or MSG 4) to the UE 115. In some examples, the first wireless communication device is the UE 115, and the second wireless communication device is the BS 105. The UE 115 receives a random access message (e.g., MSG 2 and/or MSG 4) from the BS 105 and transmits a random access message (e.g., MSG 1, MSG 3, and/or an ACK in response to MSG 4) to the BS 105.

Figure 17:
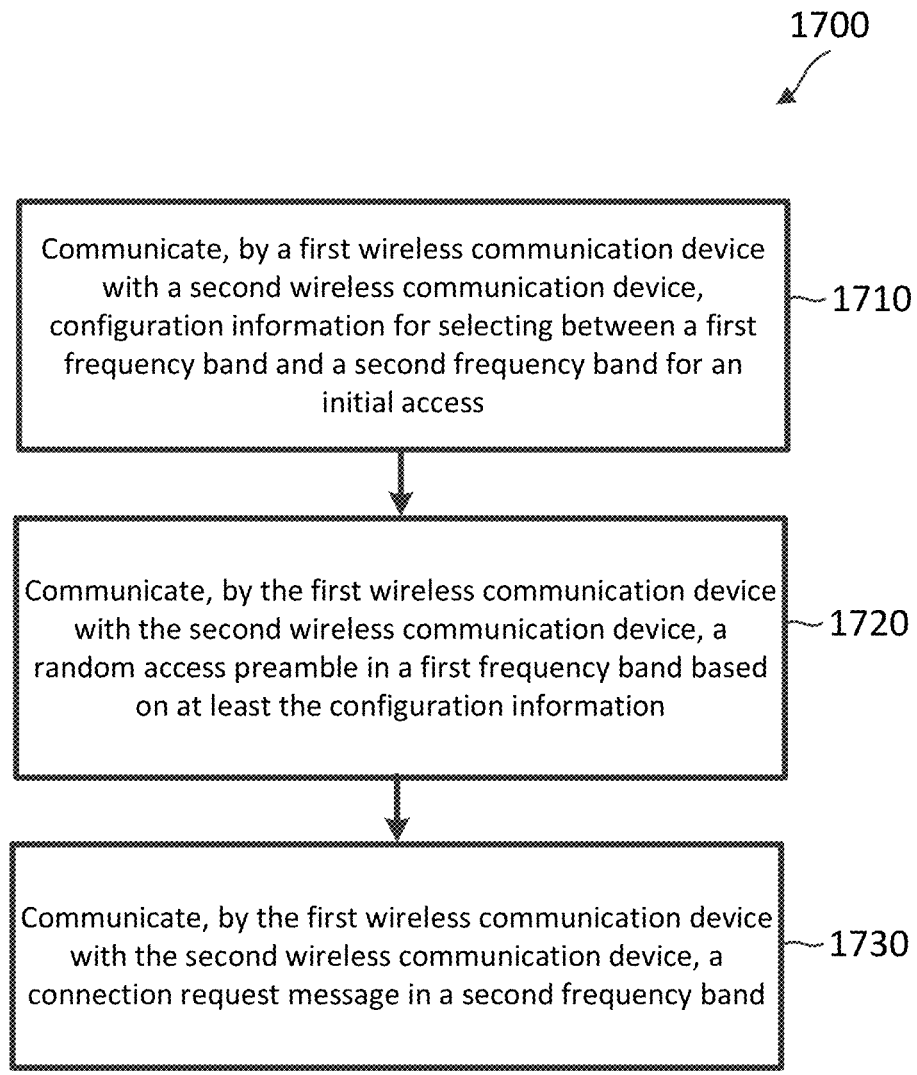
FIG. 17 is a flow diagram of a random access message communication method according to embodiments of the present disclosure.

FIG. 17 is a flow diagram of a random access message communication method 1700 according to embodiments of the present disclosure. Steps of the method 1700 can be executed by a computing device (e.g., a processor, processing circuit, and/or other suitable component) or other suitable means for performing the steps. For example, a UE, such as the UE 115 or UE 900, may utilize one or more components, such as the processor 902, the memory 904, the LBT communication module 908, the random access message module 909, and the transceiver 910, to execute the steps of method 1700. In another example, a BS, such as the BS 105 or BS 800, may utilize one or more components, such as the processor 802, the memory 804, the LBT communication module 808, the random access message module 809, and the transceiver 810, to execute the steps of method 1700. The method 1700 may employ similar mechanisms as in the methods 500, 600, and/or 700 described with respect to FIGS. 5, 6, and/or 7, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes communicating, by a first wireless communication device with a second wireless communication device, configuration information for selecting between a first frequency band and a second frequency band for an initial access. One of the first frequency band and the second frequency band may be in a licensed frequency band (e.g., SUL carrier), the other one of the first frequency band and the second frequency band may be in an unlicensed frequency band (e.g., primary UL carrier).

In an example, the first wireless communication device is the BS 105, the second wireless communication device is the UE 115, and the configuration information includes a measurement threshold (e.g., Reference Signal Received Power (RSRP) threshold) associated with traffic load in the first and second frequency bands. In an example, the BS 105 broadcasts the configuration information.

In another example, the first wireless communication device is the UE 115, the second wireless communication device is the BS 105, and configuration information includes a measurement threshold (e.g., Reference Signal Received Power (RSRP) threshold) associated with traffic load in the first and second frequency bands. In this example, the UE 115 receives the configuration information from the BS 105.

At step 1720, the method 1700 includes communicating, by the first wireless communication device with the second wireless communication device, a random access preamble in a first frequency band based on at least the configuration information. In an example, the first wireless communication device is the BS 105, the second wireless communication device is the UE 115, and the random access preamble is included in the MSG 1. In this example, the BS 105 receives the MSG 1 in the first frequency band from the UE 115. In another example, the first wireless communication device is the UE 115, the second wireless communication device is the BS 105, and the random access preamble is included in the MSG 1. In this example, the UE 115 transmits the MSG 1 in the first frequency band to the BS 105.

At step 1730, the method 1700 includes communicating, by the first wireless communication device with the second wireless communication device, a connection request message in a second frequency band. In an example, the first wireless communication device is the BS 105, the second wireless communication device is the UE 115, and the MSG 3 includes the connection request message and corresponds to the MSG 1. In this example, the BS 105 receives the MSG 3 in the second frequency band from the UE 115. In another example, the first wireless communication device is the UE 115, the second wireless communication device is the BS 105, and the MSG 3 includes the connection request message and corresponds to the MSG 1. In this example, the UE 115 transmits the MSG 3 in the second frequency band to the BS 105.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including communicating, by a first wireless communication device with a second wireless communication device, mode information for determining whether to perform a listen-before-talk (LBT) mode for a random access procedure; and communicating, by the first wireless communication device with the second wireless communication device, a random access message based on the mode information.

In some examples, the LBT mode is a category 4 LBT mode, a category 2 LBT mode, or a no LBT mode. In some examples, the first wireless communication device is a base station (BS), and the second wireless communication device is a user equipment (UE). In an example, communicating the mode information includes transmitting, by the BS, a group-common PDCCH to the UE. In another example, communicating the mode information includes transmitting, by the BS, a second random access message that carries an UL grant to the UE, the UL grant indicating the LBT mode. In some examples, the UL grant indicates a channel access priority class for transmission of the random access message. In some examples, communicating the mode information includes transmitting, by the BS, a DL grant indicating scheduling information for a second random access message and transmission, by the UE, of the second random access message in accordance with the DL grant.

In some examples, the method further includes receiving, by the BS, a first set of random access channel (RACH) preambles from a first set of UEs and a second set of RACH preambles from a second set of UEs, wherein communicating the mode information includes communicating a first LBT mode for the first set of RACH preambles and communicating a second LBT mode for the second set of RACH preambles. In some examples, communicating the random access message includes receiving, by the BS, the random access message, and wherein the random access message includes at least one of a random access preamble, a connection request, or an acknowledgement for a connection response. In some examples, communicating the random access message includes transmitting, by the BS, the random access message, and wherein the random access message includes at least one of a random access response or a connection response.

In some examples, the first wireless communication device is a UE, and the second wireless communication device is a BS. In some examples, communicating the mode information includes receiving, by the UE, a group-common PDCCH indicating a start and a duration of a transmission opportunity (TXOP), and the method further includes: determining, based on the start and the duration of the TXOP, whether to transmit a set of random access messages within the TXOP, the set of random access messages including at least the random access message; in response to a determination to transmit the set of random access messages within the TXOP, performing a category 2 LBT mode for the random access procedure; and in response to a determination to not transmit the set of random access messages within the TXOP, performing a category 4 LBT mode for the random access procedure. In some examples, the UE determines to transmit the set of random access messages within the first TXOP, and the method further includes transmitting, by the UE, a subset of the set of random access messages in a second TXOP using the mode information determined from the group-common PDCCH if the UE does not transmit the subset within the first TXOP, the second TXOP being subsequent to the first TXOP.

In some examples, communicating the mode information includes receiving, by the UE, a second random access message that carries an UL grant for the first random access message, and wherein communicating the random access message includes in response to a determination that the UL grant indicates a no LBT mode, transmitting, by the UE, the random access message on a channel without medium sensing, and the method further includes: in response to a determination that the UL grant indicates a category 2 LBT mode, performing, by the UE, a category 2 LBT before transmitting the random access message; and in response to a determination that the UL grant indicates a category 4 LBT mode, performing, by the UE, a category 4 LBT before transmitting the random access message. In some examples, communicating the mode information includes receiving, by the UE, a DL grant used for scheduling the random access message, wherein the random access message is an RAR or an acknowledgement for a connection response. In some examples, the DL grant indicates the LBT mode, and wherein communicating the random access message includes in response to a determination that the DL grant indicates a no LBT mode, transmitting, by the UE, the random access message on a channel without medium sensing, and the method further includes: in response to a determination that the DL grant indicates a category 2 LBT mode, performing, by the UE, a category 2 LBT before transmitting the random access message; and in response to a determination that the DL grant indicates a category 4 LBT mode, performing, by the UE, a category 4 LBT before transmitting the random access message.

In some examples, the DL grant indicates an end of a TXOP relative to transmission of the random access message, and the method further includes: receiving an indication that a medium is available to the UE for a time period; determining, based on the time period and the end of the TXOP, whether to transmit the random access message within the TXOP; in response to a determination to transmit the random access message within the TXOP, performing a category 2 LBT mode for the random access procedure; and in response to a determination to not transmit the random access message within the TXOP, performing a category 4 LBT mode for the random access procedure.

Further embodiments of the present disclosure include an apparatus including a transceiver configured to: communicate, by a first wireless communication device with a second wireless communication device, mode information for determining whether to perform an LBT mode for a random access procedure; and communicate, by the first wireless communication device with the second wireless communication device, a random access message based on the mode information. In some examples, the LBT mode is a category 4 LBT mode, a category 2 LBT mode, or a no LBT mode. In some examples, the mode information is communicated via at least one of a group-common PDCCH, an UL grant in a DL message, or a DL grant for a DL message. In some examples, the UL grant indicates a channel access priority class for transmission of the random access message. In some examples, the random access message includes at least one of a random access preamble, an RAR, a connection request, a connection response, or an acknowledgement for the connection response.

In some examples, the transceiver is further configured to communicate the mode information by receiving a group-common PDCCH that indicates a start and a duration of a transmission opportunity (TXOP), and the apparatus further includes a processor configured to: determine, based on the start and the duration of the TXOP, whether to transmit a set of random access messages within the TXOP, the set of random access messages including at least the random access message; in response to a determination to transmit the set of random access messages within the TXOP, perform a category 2 LBT mode for the random access procedure; and in response to a determination to not transmit the set of random access messages within the TXOP, perform a category 4 LBT mode for the random access procedure.

In some examples, the transceiver is further configured to communicate the mode information by receiving a second random access message that carries an UL grant for the first random access message, the UL indicating the LBT mode. In some examples, the transceiver is further configured to transmit the random access message on a channel without medium sensing in response to a determination that the UL grant indicates a no LBT mode, and the apparatus further includes a processor configured to: in response to a determination that the UL grant indicates a category 2 LBT mode, perform a category 2 LBT before transmission of the random access message; and in response to a determination that the UL grant indicates a category 4 LBT mode, perform a category 4 LBT before transmission of the random access message wherein.

In some examples, the transceiver is further configured to communicate the mode information by receiving a DL grant used for scheduling the random access message, the random access message being an RAR or an acknowledgement for a connection response. In some examples, the DL grant indicates the LBT mode, wherein the transceiver is further configured to communicate the random access message by transmitting the random access message on a channel without medium sensing, and the apparatus further includes a processor configured to: in response to a determination that the DL grant indicates a category 2 LBT mode, perform a category 2 LBT before transmission of the random access message; and in response to a determination that the DL grant indicates a category 4 LBT mode, perform a category 4 LBT before transmission of the random access message. In some examples, the DL grant indicates an end of a TXOP relative to transmission of the random access message, wherein the transceiver is further configured to receive an indication that a medium is available to the UE for a time period, and the apparatus further includes a processor configured to: determine, based on the time period and the end of the TXOP, whether to transmit the random access message within the TXOP; in response to a determination to transmit the random access message within the TXOP, perform a category 2 LBT mode for the random access procedure; and in response to a determination to not transmit the random access message within the TXOP, performs a category 4 LBT mode for the random access procedure.

Further embodiments of the present disclosure include a computer-readable medium having program code recorded thereon, the program code including: code for causing a first wireless communication device to communicate with a second wireless communication device, mode information for determining whether to perform a listen-before-talk (LBT) mode for a random access procedure; and code for causing the first wireless communication device to communicate with the second wireless communication device, a random access message based on the mode information. In some examples, the LBT mode is a category 4 LBT mode, a category 2 LBT mode, or a no LBT mode. In some examples, the mode information is communicated via at least one of a group-common PDCCH, an UL grant in a DL message, or a DL grant for a DL message. In some examples, the random access message includes at least one of a random access preamble, an RAR, a connection request, a connection response, or an acknowledgement for the connection response.

Further embodiments of the present disclosure include a method of wireless communication, including communicating, by a first wireless communication device with a second wireless communication device, configuration information for selecting between a first frequency band and a second frequency band for an initial access; communicating, by the first wireless communication device with the second wireless communication device, a random access preamble in a first frequency band based on at least the configuration information; and communicating, by the first wireless communication device with the second wireless communication device, a connection request message in a second frequency band. In some examples, the first frequency band is a primary UL, and the second frequency band is a supplemental UL (SUL). In some examples, the first frequency band is in a licensed frequency band, and the second frequency band is in an unlicensed frequency band. In some examples, the configuration information includes a measurement threshold associated with traffic load in the first and second frequency bands.

In some examples, the method further includes configuring, by the first wireless communication device, a measurement threshold based on a carrier center frequency of the first frequency band and the second frequency band and further based on a beamforming used for communications in the first frequency band and the second frequency band. In some examples, the method further includes communicating a random access message carrying an UL grant for the connection request message, the UL grant including an indication to switch to a frequency band different from the first frequency band, and the random access message being responsive to the random access preamble. In some examples, the method further includes receiving, by the first wireless communication device, a set of random access preambles in the first frequency band from a set of UEs, the first set of random access preambles including at least the random access preamble; for a first subset of the set of UEs, transmitting, by the first wireless communication device, a random access message carrying an indication to transmit a first connection request message in the second frequency band; and for a second subset of the set of UEs, transmitting, by the first wireless communication device, a random access message carrying an indication to perform a category 2 LBT on the first frequency band before transmission of the connection request message.

In some examples, the method further includes communicating, by the first wireless communication device, a random access message carrying an UL grant for the first frequency band. In some examples, the method further includes communicating, by the first wireless communication device, a random access message carrying a first UL grant for the first frequency band and a second UL grant for the second frequency band. In some examples, the method further includes receiving, by the first wireless communication device, a random access message carrying an UL grant for the first frequency band; determining, by the first wireless communication device, a failure to transmit the connection request message in the first frequency band; and in response to a determination of the failure, switching, based on the UL grant, to the second frequency band for transmission of the connection request message. In some examples, the method further includes communicating, by the first wireless communication device, a random access message carrying a first UL grant for the first frequency band and a second UL grant for the second frequency band.

In some examples, the method further includes determining that a number of failures to transmit the connection request message in the first frequency band exceeds a threshold, wherein communicating the connection request message includes in response to a determination that the number exceeds the threshold, using one or more resources in the second frequency band to transmit the connection request message. In some examples, the method further includes determining, by the first wireless communication device, to switch from the first frequency band to the second frequency band for transmission of the connection request message. In some examples, the method further includes communicating an indication to schedule UL resources for transmission of the connection request message; and in response to communicating the indication, communicating a random access message to schedule the UL resources for transmission of the connection request message in the second frequency band.

Further embodiments of the present disclosure include an apparatus including: a transceiver configured to: communicate, by a first wireless communication device with a second wireless communication device, configuration information for selecting between a first frequency band and a second frequency band for an initial access; communicate, by the first wireless communication device with the second wireless communication device, a random access preamble in a first frequency band based on at least the configuration information; and communicate, by the first wireless communication device with the second wireless communication device, a connection request message in a second frequency band. In some examples, the first frequency band is a primary UL, and the second frequency band is a supplemental UL (SUL). In some examples, the first frequency band is in a licensed frequency band, and the second frequency band is in an unlicensed frequency band. In some examples, the configuration information includes a measurement threshold associated with traffic load in the first and second frequency bands. In some examples, the transceiver is further configured to communicate an indication to switch to a frequency band different from the first frequency band to the UE.

Further embodiments of the present disclosure include a computer-readable medium having program code recorded thereon, the program code including: code for causing a first wireless communication device to communicate with a second wireless communication device, configuration information for selecting between a first frequency band and a second frequency band for an initial access; code for causing the first wireless communication device to communicate with the second wireless communication device, a random access preamble in a first frequency band based on at least the configuration information; and code for causing the first wireless communication device to communicate with the second wireless communication device, a connection request message in a second frequency band. In some examples, the first frequency band is a primary UL, and the second frequency band is a supplemental UL (SUL). In some examples, the first frequency band is in a licensed frequency band, and the second frequency band is in an unlicensed frequency band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, mode information for determining a listen-before-talk (LBT) mode for a random access procedure, wherein the communicating the mode information includes communicating a group-common physical downlink control channel (PDCCH) indicating a start and a duration of a transmission opportunity (TXOP);
determining, by the first wireless communications device based at least on the start and the duration of the TXOP, whether to transmit a random access message within the TXOP; and
communicating, by the first wireless communication device with the second wireless communication device, the random access message based on the mode information in response to the determining.

2. The method of claim 1, wherein the LBT mode is a category 4 LBT mode, a category 2 LBT mode, or a no LBT mode.

3. The method of claim 1, wherein the first wireless communication device is a user equipment (UE), and the second wireless communication device is a base station (BS).

4. The method of claim 3, wherein communicating the mode information includes receiving, by the UE, the group-common PDCCH from the BS.

5. The method of claim 3, wherein communicating the mode information includes receiving, by the UE, a random access response (RAR) message that carries an uplink (UL) grant from the BS, the UL grant indicating the mode information.

6. The method of claim 5, wherein the UL grant indicates a channel access priority class for transmission of the RAR.

7. The method of claim 3, wherein communicating the mode information includes:
receiving, by the UE, a downlink (DL) grant indicating scheduling information for a second random access message; and
transmission, by the UE, of the second random access message in accordance with the DL grant.

8. The method of claim 3, further comprising:
transmitting, by the UE, a random access channel (RACH) preamble, wherein the RACH preamble is one of a set of RACH preambles from a set of UEs including the UE, wherein communicating the mode information includes communicating a first LBT mode for the set of RACH preambles that is different from a second LBT mode for a second set of RACH preambles.

9. The method of claim 3, wherein communicating the random access message includes transmitting, by the UE, the random access message, and wherein the random access message includes at least one of a random access preamble, a connection request, or an acknowledgement for a connection response.

10. The method of claim 3, wherein communicating the random access message includes receiving, by the UE, the random access message, and wherein the random access message includes at least one of a random access response or a connection response.

11. The method of claim 3, wherein communicating the mode information includes receiving, by the UE, the group-common PDCCH indicating the start and the duration of the TXOP, and the random access message comprises a set of random access messages, the method further comprising:
in response to a determination to transmit the set of random access messages within the TXOP, performing a category 2 LBT mode for the random access procedure; and
in response to a determination to not transmit the set of random access messages within the TXOP, performing a category 4 LBT mode for the random access procedure.

12. The method of claim 11, wherein the UE determines to transmit the set of random access messages within the TXOP, the method further comprising:
transmitting, by the UE, a subset of the set of random access messages in a second TXOP using the mode information determined from the group-common PDCCH if the UE does not transmit the subset within the TXOP, the second TXOP being subsequent to the TXOP.

13. The method of claim 3, wherein communicating the mode information includes receiving, by the UE, another random access message that carries an uplink (UL) grant for the random access message, and wherein communicating the random access message includes in response to a determination that the UL grant indicates a no LBT mode, transmitting, by the UE, the random access message on a channel without medium sensing, the method further comprising:
in response to a determination that the UL grant indicates a category 2 LBT mode, performing, by the UE, a category 2 LBT before transmitting the random access message; and
in response to a determination that the UL grant indicates a category 4 LBT mode, performing, by the UE, a category 4 LBT before transmitting the random access message.

14. The method of claim 3, wherein communicating the mode information includes receiving, by the UE, a downlink (DL) grant used for scheduling the random access message, wherein the random access message is a random access response (RAR) or an acknowledgement for a connection response.

15. The method of claim 14, wherein the DL grant indicates the LBT mode, and wherein communicating the random access message includes in response to a determination that the DL grant indicates a no LBT mode, transmitting, by the UE, the random access message on a channel without medium sensing, the method further comprising:
in response to a determination that the DL grant indicates a category 2 LBT mode, performing, by the UE, a category 2 LBT before transmitting the random access message; and
in response to a determination that the DL grant indicates a category 4 LBT mode, performing, by the UE, a category 4 LBT before transmitting the random access message.

16. The method of claim 14, wherein the DL grant indicates an end of a second TXOP relative to transmission of the random access message, the method further comprising:
receiving an indication that a medium is available to the UE for a time period;
determining, based on the time period and the end of the second TXOP, whether to transmit the random access message within the second TXOP;
in response to a determination to transmit the random access message within the second TXOP, performing a category 2 LBT mode for the random access procedure; and in response to a determination to not transmit the random access message within the second TXOP, performing a category 4 LBT mode for the random access procedure.

17. An apparatus comprising:
a transceiver configured to:
communicate, by a first wireless communication device with a second wireless communication device, mode information for determining a listen-before-talk (LBT) mode for a random access procedure, wherein the transceiver is further configured to communicate the mode information by communicating a group-common physical downlink control channel (PDCCH) indicating a start and a duration of a transmission opportunity (TXOP); and
a processor configured to:
determine, based at least on the start and the duration of the TXOP, whether to transmit a random access message within the TXOP; and
the transceiver further configured to communicate, by the first wireless communication device with the second wireless communication device, the random access message based on the mode information in response to the determination.

18. The apparatus of claim 17, wherein the LBT mode is a category 4 LBT mode, a category 2 LBT mode, or a no LBT mode.

19. The apparatus of claim 17, wherein the mode information is communicated via at least one of the group-common PDCCH, an uplink (UL) grant in a downlink (DL) message, or a DL grant for the DL message.

20. The apparatus of claim 19, wherein the UL grant indicates a channel access priority class for transmission of the random access message.

21. The apparatus of claim 17, wherein the random access message includes at least one of a random access preamble, a random access response (RAR), a connection request, a connection response, or an acknowledgement for the connection response.

22. The apparatus of claim 17, wherein the transceiver is further configured to communicate the mode information by receiving the group-common PDCCH that indicates the start and the duration of the TXOP, and the random access message comprises a set of random access messages, the apparatus further comprising a processor configured to:
in response to a determination to transmit the set of random access messages within the TXOP, perform a category 2 LBT mode for the random access procedure; and
in response to a determination to not transmit the set of random access messages within the TXOP, perform a category 4 LBT mode for the random access procedure.

23. The apparatus of claim 17, wherein the transceiver is further configured to communicate the mode information by:
receiving another random access message that carries an uplink (UL) grant for the random access message, the UL grant indicating the LBT mode.

24. The apparatus of claim 23, wherein the transceiver is further configured to transmit the random access message on a channel without medium sensing in response to a determination that the UL grant indicates a no LBT mode, the apparatus further comprising a processor configured to:
in response to a determination that the UL grant indicates a category 2 LBT mode, perform a category 2 LBT before transmission of the random access message; and
in response to a determination that the UL grant indicates a category 4 LBT mode, perform a category 4 LBT before transmission of the random access message wherein.

25. The apparatus of claim 17, wherein the transceiver is further configured to communicate the mode information by:
receiving a downlink (DL) grant used for scheduling the random access message, the random access message being a random access response (RAR) or an acknowledgement for a connection response.

26. The apparatus of claim 25, wherein the DL grant indicates the LBT mode, and wherein the transceiver is further configured to communicate the random access message by transmitting the random access message on a channel without medium sensing, the apparatus further comprising a processor configured to:
in response to a determination that the DL grant indicates a category 2 LBT mode, perform a category 2 LBT before transmission of the random access message; and
in response to a determination that the DL grant indicates a category 4 LBT mode, perform a category 4 LBT before transmission of the random access message.

27. The apparatus of claim 25, wherein the DL grant indicates an end of a second TXOP relative to transmission of the random access message, and wherein the transceiver is further configured to receive an indication that a medium is available to the apparatus for a time period, the apparatus further comprising a processor configured to:
determine, based on the time period and the end of the second TXOP, whether to transmit the random access message within the second TXOP;
in response to a determination to transmit the random access message within the second TXOP, perform a category 2 LBT mode for the random access procedure; and
in response to a determination to not transmit the random access message within the second TXOP, performs a category 4 LBT mode for the random access procedure.

28. A non-transitory computer-readable medium having program code recorded thereon, the program code comprising:
code for causing a first wireless communication device to communicate with a second wireless communication device, mode information for determining a listen-before-talk (LBT) mode for a random access procedure, wherein the code for causing the first wireless communication device to communicate the mode information is further configured to cause the first wireless communication device to communicate, with the second wireless communication device, the mode information by communicating a group-common physical downlink control channel (PDCCH) indicating a start and a duration of a transmission opportunity (TXOP);
code for causing the first wireless communication device to determine, based at least on the start and the duration of the TXOP, whether to transmit a random access message within the TXOP using a category 2 LBT mode, or not within the TXOP using a category 4 LBT mode; and
code for causing the first wireless communication device to communicate with the second wireless communication device, the random access message based on the determination.

29. The non-transitory computer-readable medium of claim 28, wherein the LBT mode is the category 4 LBT mode, the category 2 LBT mode, or a no LBT mode.

30. The non-transitory computer-readable medium of claim 28, wherein the mode information is communicated via at least one of the group-common PDCCH, an uplink (UL) grant in a downlink (DL) message, or a DL grant for the DL message.

31. The non-transitory computer-readable medium of claim 28, wherein the random access message includes at least one of a random access preamble, a random access response (RAR), a connection request, a connection response, or an acknowledgement for the connection response.

* * * * *